(12) United States Patent
Singh et al.

(10) Patent No.: US 12,508,254 B2
(45) Date of Patent: Dec. 30, 2025

(54) ORALLY DISINTEGRATING PHARMACEUTICAL COMPOSITIONS OF APIXABAN

(71) Applicant: UNISON PHARMACEUTICALS PVT. LTD., Ahmedabad (IN)

(72) Inventors: Balvir Singh, Ahmedabad (IN); Ramesh Shingala, Ahmedabad (IN); Shivang Prajapati, Ahmedabad (IN)

(73) Assignee: UNISON PHARMACEUTICALS PVT. LTD., Ahmedabad (IN)

( * ) Notice: Subject to any disclaimer, the term of this patent is extended or adjusted under 35 U.S.C. 154(b) by 863 days.

(21) Appl. No.: 17/605,825

(22) PCT Filed: Oct. 31, 2020

(86) PCT No.: PCT/IN2020/050919
§ 371 (c)(1),
(2) Date: Oct. 22, 2021

(87) PCT Pub. No.: WO2021/095048
PCT Pub. Date: May 20, 2021

(65) Prior Publication Data
US 2022/0211689 A1 Jul. 7, 2022

(30) Foreign Application Priority Data
Nov. 13, 2019 (IN) .............................. 201921046107

(51) Int. Cl.
*A61K 31/4545* (2006.01)
*A61K 9/00* (2006.01)
*A61K 9/20* (2006.01)

(52) U.S. Cl.
CPC ........ *A61K 31/4545* (2013.01); *A61K 9/0056* (2013.01); *A61K 9/2018* (2013.01); *A61K 9/2027* (2013.01); *A61K 9/2054* (2013.01); *A61K 9/2059* (2013.01)

(58) Field of Classification Search
CPC .............. A61K 31/4545; A61K 9/0056; A61K 9/2018; A61K 9/2054; A61K 9/2059; A61K 9/2027
See application file for complete search history.

(56) References Cited

U.S. PATENT DOCUMENTS

| | | | |
|---|---|---|---|
| 2013/0045245 A1 | 2/2013 | Patel et al. | |
| 2015/0182457 A1 | 7/2015 | Huang et al. | |
| 2015/0224053 A1 | 8/2015 | Badawy et al. | |
| 2016/0263097 A1 | 9/2016 | Badawy et al. | |
| 2019/0022008 A1* | 1/2019 | Huang ................. | A61K 9/2013 |

FOREIGN PATENT DOCUMENTS

| | | | | |
|---|---|---|---|---|
| CN | 102058889 | A | 5/2011 | |
| CN | 102908324 | A | 2/2013 | |
| CN | 103830199 | A | 6/2014 | |
| CN | 104095823 | A | 10/2014 | |
| CN | 104490834 | A | 4/2015 | |
| CN | 104490841 | A | 4/2015 | |
| CN | 104523619 | A | 4/2015 | |
| CN | 104644593 | A | 5/2015 | |
| CN | 105832672 | A | 8/2016 | |
| CN | 105943536 | A | 9/2016 | |
| CN | 105982870 | A | 10/2016 | |
| CN | 106420651 | A | 2/2017 | |
| CN | 104173313 | B | 5/2017 | |
| CN | 106913528 | A | 7/2017 | |
| CN | 107661301 | A * | 2/2018 | ......... A61K 31/4545 |
| CN | 107773549 | A | 3/2018 | |
| CN | 107898824 | A | 4/2018 | |
| CN | 108096205 | A | 6/2018 | |
| CN | 108553441 | A | 9/2018 | |
| CN | 108904461 | A | 11/2018 | |
| CN | 109010273 | A | 12/2018 | |
| CN | 109528674 | A | 3/2019 | |
| CN | 109793715 | A | 5/2019 | |
| CN | 110123770 | A | 8/2019 | |
| CN | 110772490 | A | 2/2020 | |
| CN | 110934839 | A | 3/2020 | |
| CN | 111000820 | A | 4/2020 | |
| CN | 111214442 | A | 6/2020 | |
| CN | 106822006 | B | 8/2020 | |

(Continued)

OTHER PUBLICATIONS

Rautio, J.; et al. "The expanding role of prodrugs in contemporary drug design and development" 2018, Nat. Rev. Drug Discovery, vol. 17, pp. 559-587. (Year: 2018).*
Jain, H. K.; et al. "Formulation Development and Stability Indicating HPLC Assay of Tablets of Apixaban" 2017, International Journal of Pharmacy and Pharmaceutical Sciences, vol. 9, pp. 24-32. (Year: 2017).*
English language machine translation of CN 107661301 A; translated Dec. 17, 2024. (Year: 2018).*
International Search Report (PCT/ISA/210) and Written Opinion (PCT/ISA/237) mailed on Jan. 29, 2021, by the Indian Patent Office as the International Searching Authority for International Application No. PCT/IN2020/050919.
"Bioavailability of Apixaban Crushed Tablet", U.S. National Library of Medicine, May 2014, 7 pages, cited at https://clinicaltrials.gov/ct2/show/NCT02101112.
"Eliquis USFDA Approval Label", Mar. 2014.
Asati, Amit Vinayak, et al., "Solubility Enhancement of BCS Classified II/IV Drug—Solid Dispersion of Apixaban by Solvent Evaporation", Int. J. Pharm. Investigation, 2020; vol. 10, No. 4, pp. 430-436.

(Continued)

*Primary Examiner* — Eric Olson
*Assistant Examiner* — Benjamin M Brandsen
(74) *Attorney, Agent, or Firm* — BUCHANAN INGERSOLL & ROONEY PC

(57) ABSTRACT

The present invention relates to an orally disintegrating pharmaceutical dosage forms of apixaban or a pharmaceutically acceptable salt or prodrug thereof. The present invention specifically relates to a stable orally disintegrating pharmaceutical composition comprising apixaban and one or more pharmaceutically acceptable excipients. Further, the present invention relates to an orally disintegrating dosage form comprising apixaban, at least one disintegrating excipient and optionally one or more pharmaceutically acceptable excipients for treatment of disorders associated with Factor Xa.

19 Claims, 6 Drawing Sheets

(56) References Cited

FOREIGN PATENT DOCUMENTS

| | | | | |
|---|---|---|---|---|
| CN | 111494326 | A | 8/2020 | |
| CN | 113041227 | A | 6/2021 | |
| CN | 109464415 | B | 8/2021 | |
| EP | 2554159 | A1 * | 2/2013 | ......... A61K 31/4545 |
| EP | 2907507 | A1 | 8/2015 | |
| EP | 3243505 | A1 | 11/2017 | |
| EP | 3669866 | A1 | 6/2020 | |
| IN | 2015CH02162 | A | 11/2016 | |
| IN | 2015MU03987 | A | 6/2017 | |
| IN | 201621001853 | A | 10/2017 | |
| IN | 201641006652 | A | 11/2017 | |
| IN | 201621021634 | A | 12/2017 | |
| IN | 201721005627 | A | 8/2018 | |
| IN | 201721005628 | A | 8/2018 | |
| IN | 201621013502 | | 8/2019 | |
| IN | 201721022924 | | 8/2019 | |
| IN | 201821038745 | | 6/2020 | |
| IN | 202021051021 | | 4/2021 | |
| KR | 20190107887 | A | 9/2019 | |
| WO | 2011106478 | A2 | 9/2011 | |
| WO | 2013022924 | A1 | 2/2013 | |
| WO | 2014052678 | A1 | 4/2014 | |
| WO | 2015097090 | A1 | 7/2015 | |
| WO | 2015103230 | A1 | 7/2015 | |
| WO | 2015121472 | A1 | 8/2015 | |
| WO | 2017121340 | A1 | 7/2017 | |
| WO | 2017125535 | A1 | 7/2017 | |
| WO | 2017163170 | A1 | 9/2017 | |
| WO | 2017182908 | A1 | 10/2017 | |
| WO | 2017221209 | A1 | 12/2017 | |
| WO | 2018150286 | A1 | 8/2018 | |
| WO | 2019151965 | A2 | 8/2019 | |
| WO | 2019177318 | A1 | 9/2019 | |
| WO | 2019204193 | A1 | 10/2019 | |
| WO | 2020030991 | A1 | 2/2020 | |
| WO | 2020127819 | A2 | 6/2020 | |
| WO | 2021095048 | A1 | 5/2021 | |

OTHER PUBLICATIONS

Byon, Wonkyung, et al., "Apixaban: A Clinical Pharmacokinetic and Pharmacodynamic Review", Clinical Pharmacokinetics, 2019, vol. 58, pp. 1265-1279.

Chen, Yong, et al., "Improving the Solubility and Bioavailability of Apixaban via Apixaban-Oxalic Acid Cocrystal", Crystal Growth & Design, 2016, vol. 16, No. 5, pp. 2923-2930.

Frost, Charles, et al., "Apixaban Single-Dose Pharmacokinetics, Bioavailability, Renal Clearance, and Pharmacodynamics Following Intravenous and Oral Administration", Clinical Pharmacology in Drug Development, 2021, vol. 10, No. 9, pp. 974-984.

Joshi, Arjun L., et al., "Formulation and evaluation of sublingual films of apixaban", International Journal of Pharmaceutical and Biological Science ArchivePubMed, vol. 7, Issue 2, Mar.-Apr. 2019, pp. 80-116, http://www.ijpba.in/index.php/ijpba/article/view/117.

Odell, Kevin, et al., "Safety of Apixaban Administered via Nasogastric Tube", Cardiology, 2019, 142, p. 39.

Song, Yan, et al., "Evaluation of Crushed Tablet for Oral Administration and the Effect of Food on Apixaban Pharmacokinetics in Healthy Adults", Clinical Therapeutics, vol. 38, Issue 7, 2016, pp. 1674-1685, https://www.sciencedirect.com/science/article/pii/S0149291816303101.

Song, Yan, et al., "Relative Bioavailability of Apixaban Solution or Crushed Tablet Formulations Administered by Mouth or Nasogastric Tube in Healthy Subjects", Clinical Therapeutics, vol. 37, Issue 8, 2015, pp. 1703-1712, https://www.sciencedirect.com/science/article/pii/S0149291815008309.

Vadaliwala, Munavvar A., et al., "Development and Evaluation of Orodispersible Tablet of Apixaban", Wordl Journal of Pharmacy and Pharmaceutical Sciences, 2019, vol. 8, Issue 5, pp. 955-974.

Xie, Zhouling, et al., "The selectivity and bioavailability improvement of novel oral anticoagulants: An overview", European Journal of Medicinal Chemistry, 2018, vol. 146, pp. 299-317.

* cited by examiner

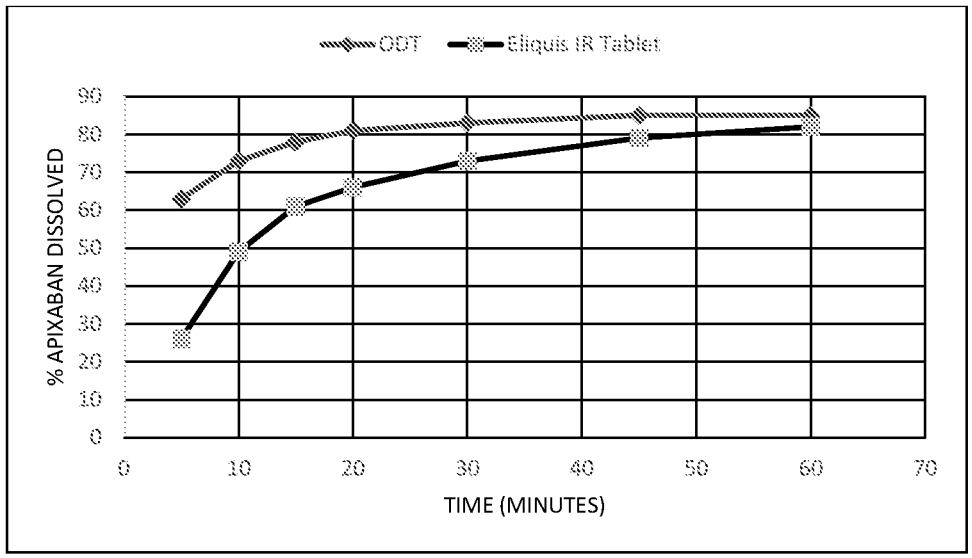
Figure 1: Comparative dissolution profile of apixaban (5 mg) orally disintegrating tablet and film-coated immediate release tablets ELIQUIS® of at pH 6.8
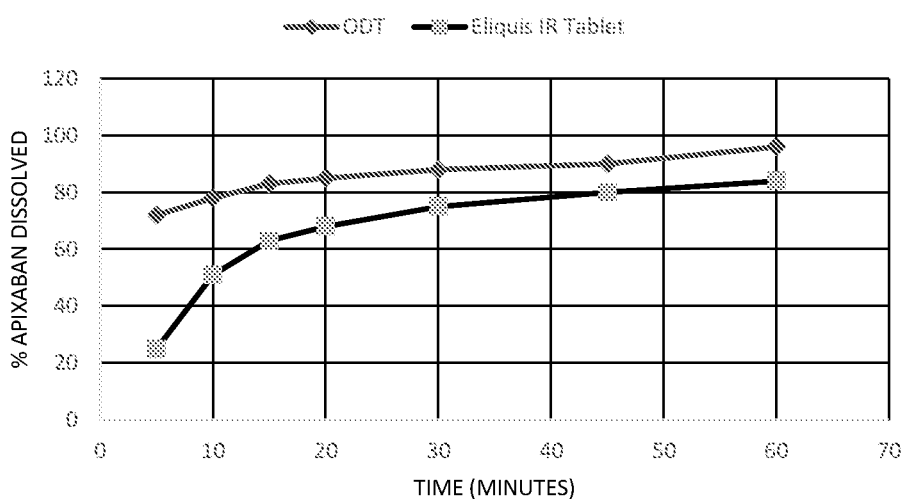
Figure 2: Comparative dissolution profile of apixaban (5 mg) orally disintegrating tablet and film-coated immediate release tablets ELIQUIS® of at pH 4.5

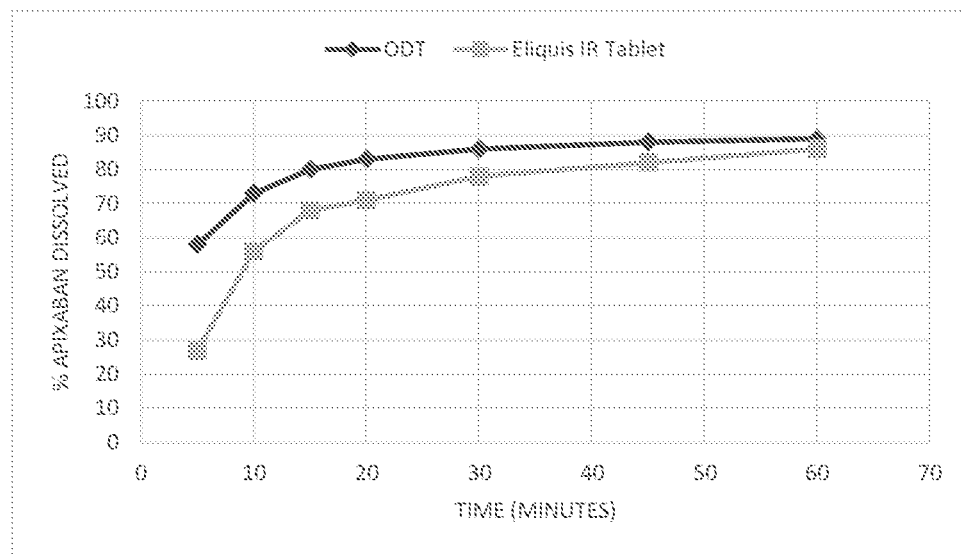
Figure 3: Comparative dissolution profile of apixaban (5 mg) orally disintegrating tablet and film-coated immediate release tablets ELIQUIS® of at pH 1.2

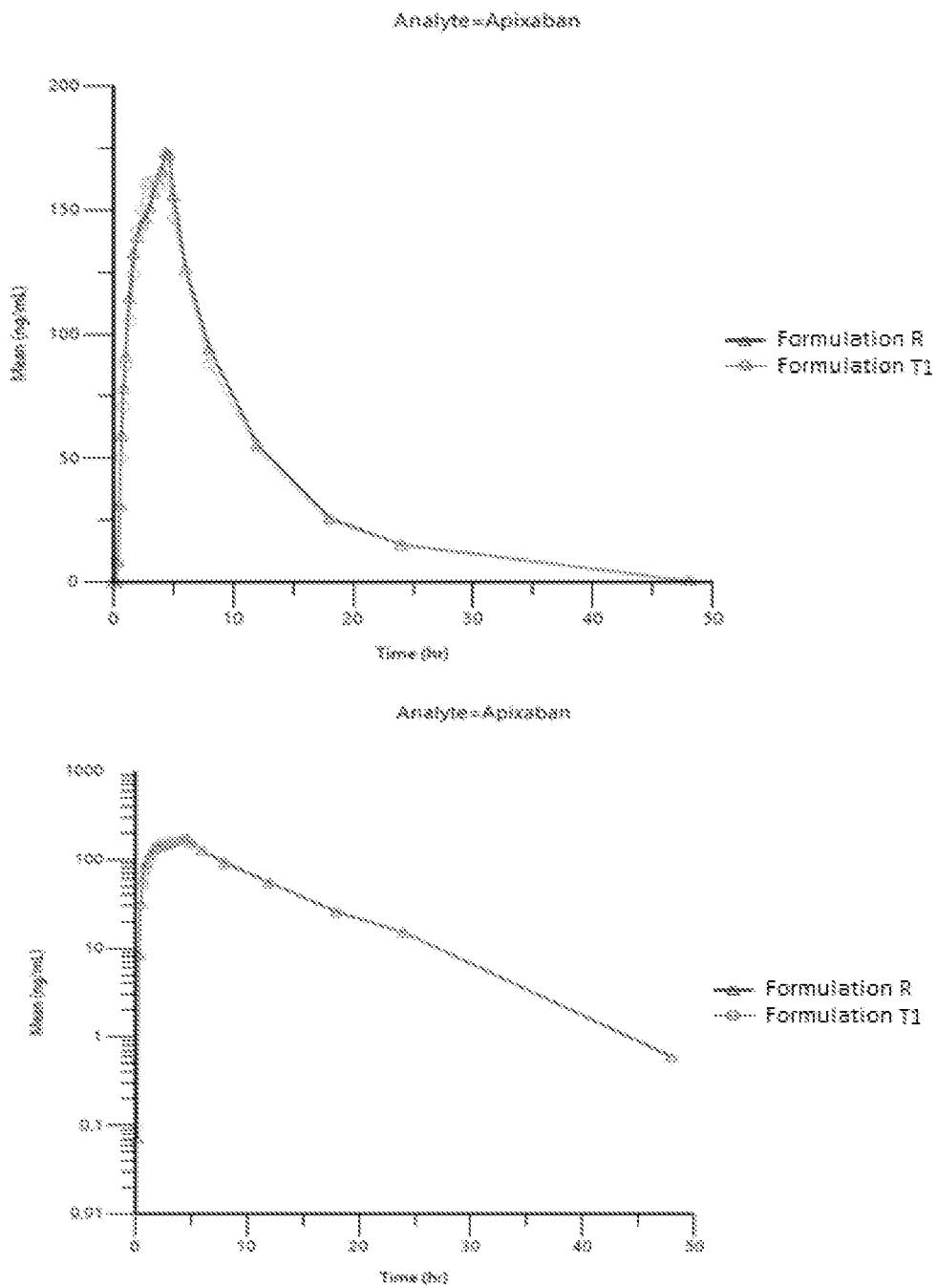
Figure 4: Linear and semi-logarithmic plots of mean plasma concentration (MPC) versus time (t) for Apixaban orally disintegrating tablet (T1: Without water) compared to ELIQUIS®

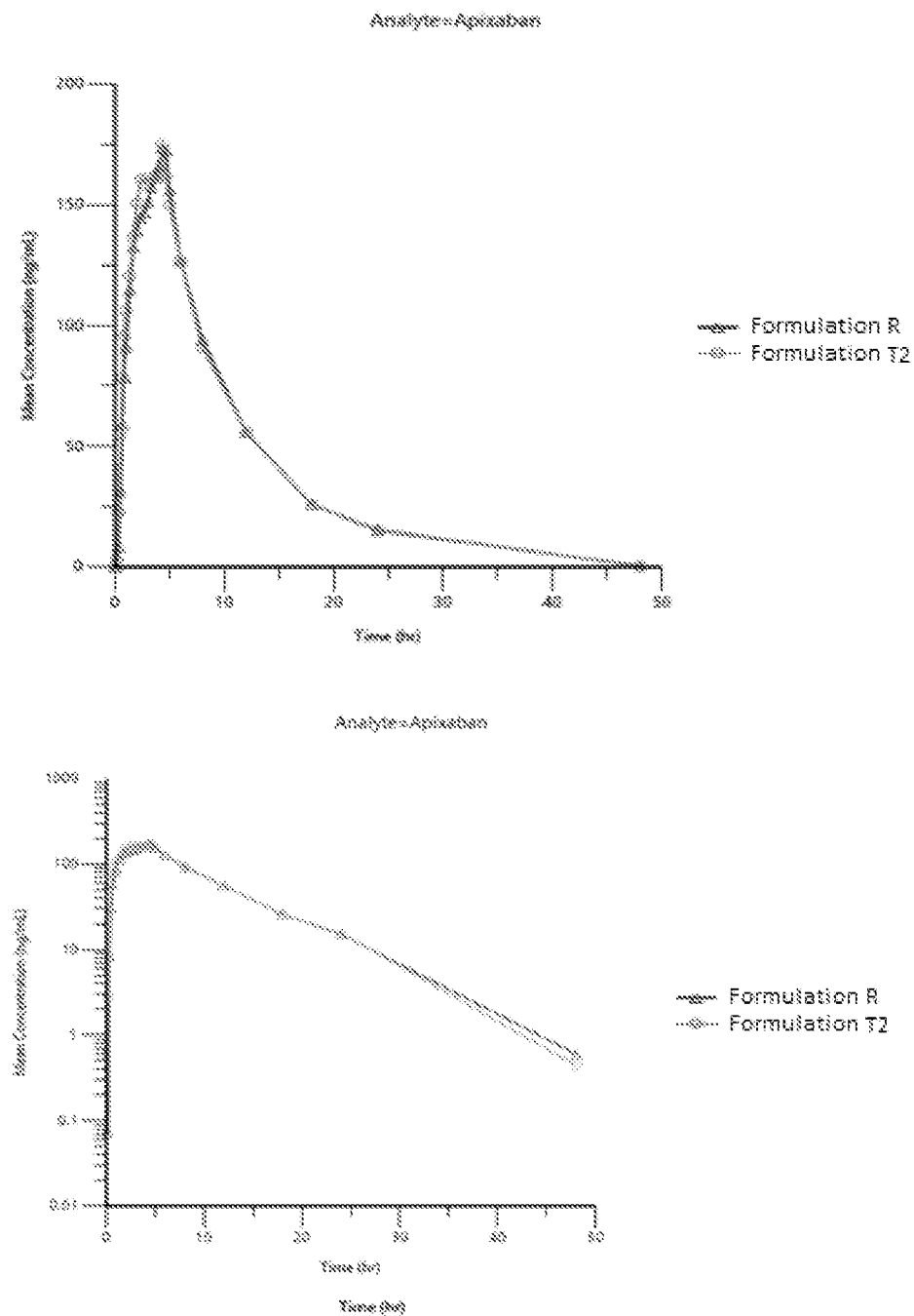
Figure 5: Linear and semi-logarithmic plots of mean plasma concentration (MPC) versus time (t) for Apixaban orally disintegrating tablet (T2: With water) compared to ELIQUIS®

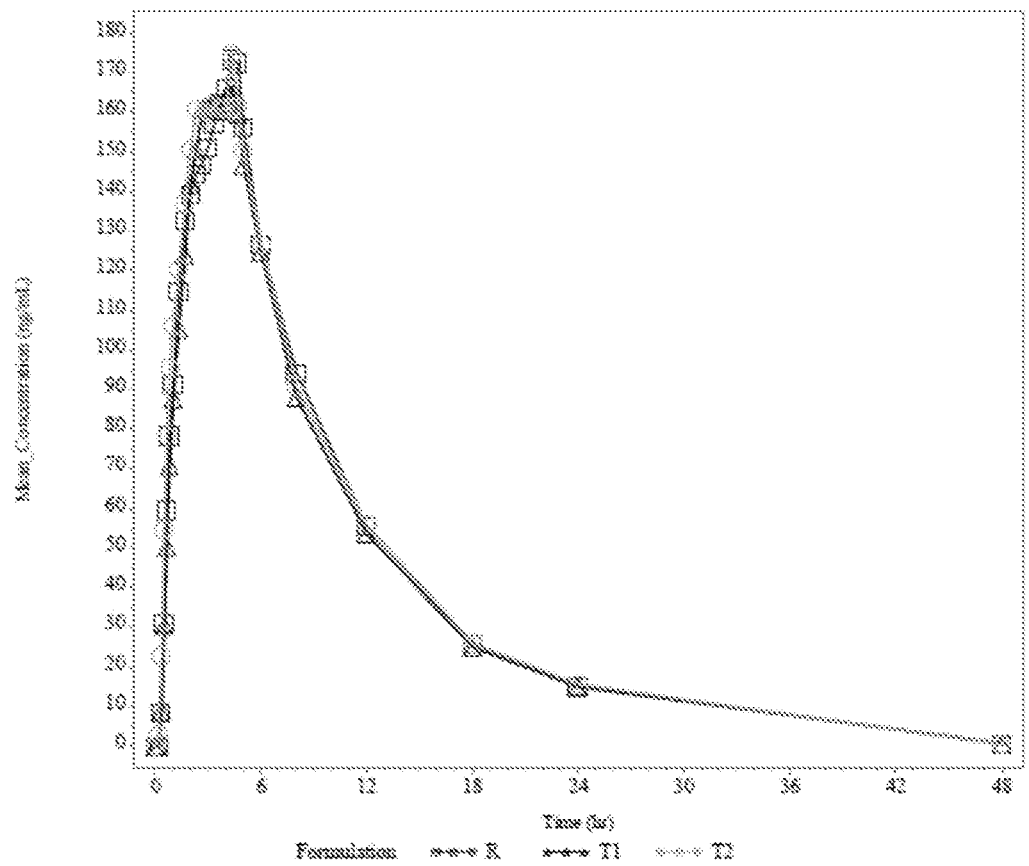
Figure 6: Comparative linear plot of mean plasma concentration (MPC) versus time (t) for Apixaban orally disintegrating tablet (T1: Without water; T2: With water & R: ELIQUIS®)

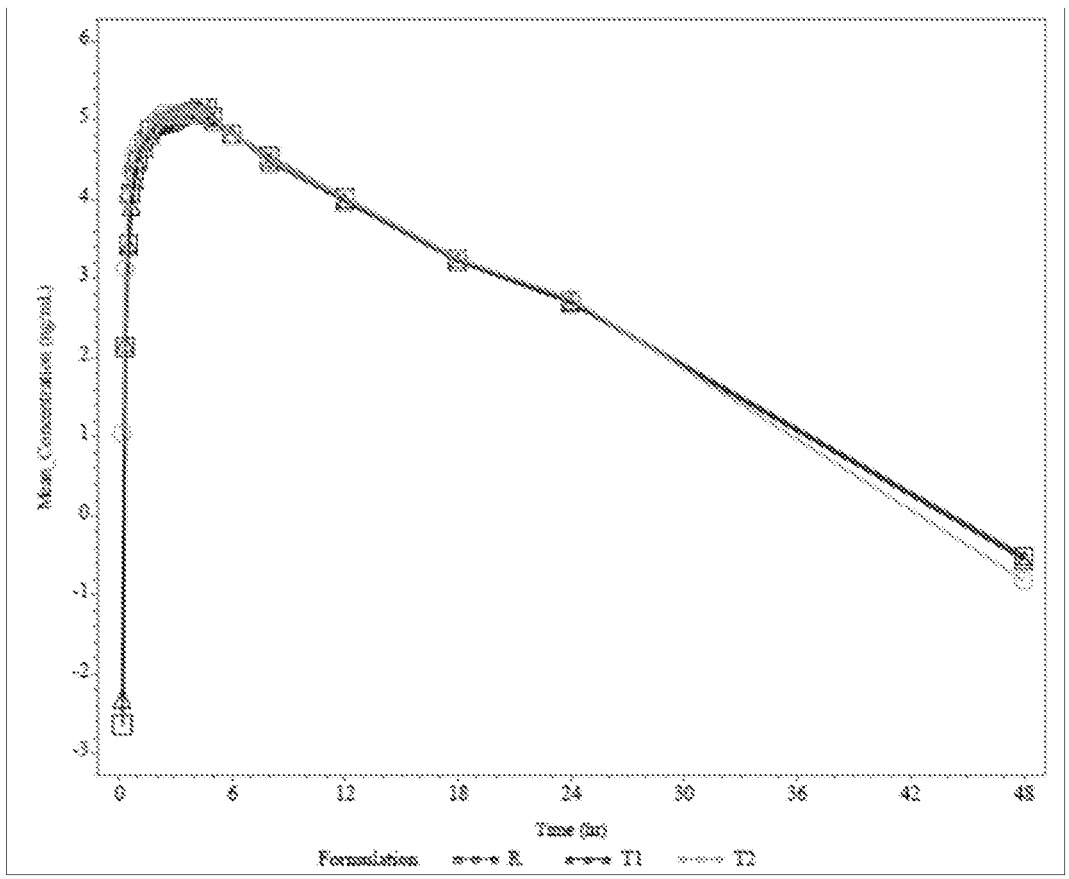
Figure 7: Comparative semi-logarithmic plot of mean plasma concentration (MPC) versus time (t) for Apixaban orally disintegrating tablet (T1: Without water; T2: With water & R: ELIQUIS®)

ORALLY DISINTEGRATING PHARMACEUTICAL COMPOSITIONS OF APIXABAN

PRIORITY APPLICATION

This application claims the benefit of priority of our Indian patent application 201921046107 filed on Nov. 13, 2019 which is incorporated herein by reference and whose disclosures are incorporated in the instant application.

FIELD OF INVENTION

The present invention relates to an orally disintegrating pharmaceutical dosage forms of apixaban or a pharmaceutically acceptable salts or prodrugs thereof. Further, the present invention relates to an orally disintegrating pharmaceutical dosage form comprising apixaban, at least one disintegrating excipient and optionally one or more pharmaceutically acceptable excipients for treatment of thromboembolic disorders associated with Factor Xa.

BACKGROUND OF THE INVENTION

Apixaban is a factor Xa (FXa) inhibitor represented by following chemical structure.

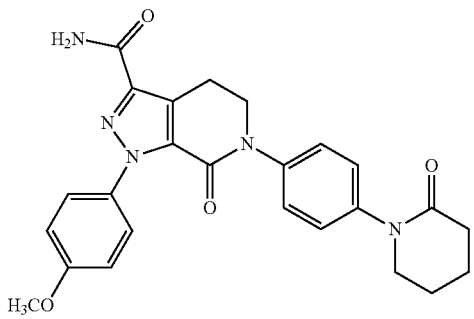

FIG. 1: Chemical structure of apixaban

The chemical name for Apixaban is 4,5,6,7-tetrahydro-1-(4-methoxyphenyl)-7-oxo-6-[4-(2-oxo-1-piperidinyl)phenyl]-1H-pyrazolo[3,4-c]pyridine-3-carboxamide (CAS name) or 1-(4-methoxyphenyl)-7-oxo-6-[4-(2-oxopiperidin-1-yl)phenyl]-4,5,6,7-tetrahydro-1H-pyrazolo[3,4-c]pyridine-3-carboxamide (IUPAC name). Its molecular formula is $C_{25}H_{25}N_5O_4$, which corresponds to a molecular weight of 459.5 g/mol.

Apixaban is a white to pale-yellow powder which is non-ionizable at physiological pH from 1.2-6.8. Its aqueous solubility across the physiological pH range is 40 μg/ml. Apixaban is a selective direct inhibitor of factor Xa and has been developed for oral administration to treat variety of indications that require the use of an antithrombotic agent.

WO 00/039131 discloses a markush structure covering nitrogen containing heterobicyclic compounds as factor Xa inhibitor, their pharmaceutical composition and method of use thereof wherein apixaban is one of the compounds covered in broad markush structure.

U.S. Pat. No. 6,967,208 discloses lactam-containing compounds and derivatives thereof as factor Xa inhibitors wherein apixaban is specifically disclosed. It also discloses immediate release pharmaceutical composition.

Apixaban has been approved under the brand name of ELIQUIS® by USFDA as an immediate release tablet dosage form since 2012. ELIQUIS® is approved in two strengths of 2.5 mg and 5 mg for the treatment of deep vein thrombosis (DVT), pulmonary embolism (PE), prophylaxis of deep vein thrombosis following hip or knee replacement surgery, reduction of risk of stroke and systemic embolism in non-valvular atrial fibrillation and reduction in the risk of recurrence of deep vein thrombosis and pulmonary embolism.

As per reported literature, particle size has been the critical factor for obtaining consistent dissolution rate in any of the apixaban product. Moreover, the tablet formulation prepared using dry granulation technology has shown more consistent dissolution rate in comparison to other processes such as wet granulation.

U.S. Pat. No. 9,326,945 discloses an immediate release apixaban pharmaceutical formulation comprising crystalline apixaban particles having a $D_{90}$ equal to or less than 89 μm and which is prepared using only dry granulation method achieves appropriate dissolution rate and optimal exposure after oral administration into human body. Tablets prepared using coarser particles of apixaban and using wet granulation method results in less than optimal exposure after oral administration.

ELIQUIS® is approved for twice daily administration and specifies the administration options for patients who are unable to swallow whole tablets. The ELIQUIS® tablets 2.5 and 5 mg may be crushed and suspended in water, 5% dextrose in water (D5W) or apple juice or mixed with applesauce and promptly administered orally. Alternatively, ELIQUIS® tablets may be crushed and suspended in 60 ml of water or D5W and promptly delivered through a nasogastric tube.

ELIQUIS® is widely prescribed medicine across all geographies and a significant proportion of patients with thromboembolic disorders have difficulty swallowing (dysphagia) in the acute phase and many have ongoing problems. This potentially can lead to a reduction in patient compliance when such patients are administered oral formulations that must be swallowed intact. Other patients may also suffer from dysphagia as this is a common problem among all age groups and has been observed in about 35% of the general population, up to 60% of the elderly institutionalized population. Hence, there is an unmet need to increase patient's compliance and provide exact required dose of drug in such diseased conditions.

It is an unmet need and also challenge to develop and obtain a stable formulation of apixaban which can obviate problems of existing marketed immediate release tablet formulation such as particle size, formulation process and development of patient compliance dosage form.

PCT Application No. WO 2014/052678 discloses liquid formulation comprising apixaban and a vehicle, which includes water and at least two solubilizers selected from a non-ionic surfactant, an ionic surfactant, a hydrophilic polymer, ethanol, a polyhydric alcohol, a polyethylene glycol, and a carbohydrate. However, preparation of liquid dosage form of apixaban poses stability challenge.

Orally disintegrating dosage forms can also be an alternative dosage for these patients. Also, orally disintegrating dosage forms do not require water and can be consumed in situations without water, such as travelling, leading to improved adherence to treatment.

IN 201641006652 patent application discloses mouth dissolving formulations of apixaban in various dosage forms such as lozenges, films, granules, and tablets. However, it merely discloses compositions without overcoming the actual problems associated with the existing marketed immediate release tablet formulation as well as without citing any problem solution approaches along with clinical advantages. Hence, due to this, the commercial viability of the said formulation cannot be determined.

Munavvar A. Vadaliwala et al, WJPPS, Volume 8, Issue 5, 955-974, merely discloses development of orodispersible tablets of apixaban without citing and overcoming the actual problems associated with the existing marketed immediate release tablet formulation. This article does not disclose about actual problem associated with apixaban particle size which is directly correlated to the clinical absorption after exposure into human body for orally disintegrating dosage form.

Further, in case of orally disintegrating dosage form where developing a clinically viable formulation by overcoming particle size and formulation challenges associated with apixaban is a major challenge, the article does not disclose any comparative preclinical or clinical studies of said orally disintegrating tablets of apixaban against comparison to existing marketed formulation and does not disclose any way forward to solve these problems.

After an undue experiments and clinical trials, the inventors of the present invention have discovered a novel approach for solving above mentioned problems by developing a stable, easy to swallow, orally disintegrating dosage form of apixaban which overcomes particle size challenges, provides manufacturing ease and overcomes the limitation of existing marketed immediate release tablet formulation as described in prior art.

The inventors of the present invention has developed an orally disintegrating tablet of apixaban bioequivalent to the immediate release tablet ELIQUIS® to overcome above mentioned challenges patient compliance and simultaneously solving the problems of less than optimal exposure and less dissolution of associated with particle size and manufacturing process.

SUMMARY OF THE INVENTION

It has been found that dissolution and absorption of apixaban is impacted by particle size and manufacturing process. Apixaban of particles with $D_{90}$ above 89 um provides inconsistent dissolution and absorption. Also, formulations prepared using wet granulation method also resulted in lower absorption of apixaban compared to those prepared using dry granulation.

Considering disintegration and dissolution being most important aspects of orally disintegrating dosage forms, the inventors of the present invention have surprisingly found that by using apixaban and disintegrating excipients in particular ratio helps overcome above mentioned problem by providing consistent dissolution and absorption irrespective of particle size of apixaban used and process of preparation of dosage form.

The present invention relates to an orally disintegrating pharmaceutical dosage form comprising a therapeutically effective amount of apixaban or a pharmaceutically acceptable salt or a prodrug thereof and at least one disintegrating excipient wherein the dosage form has hardness of about 10N to about 200N and a disintegration time of less than 3 minutes.

The present invention relates to an orally disintegrating dosage form comprising apixaban or a pharmaceutically acceptable salts or prodrugs thereof and at least one disintegrating excipient wherein apixaban and disintegrating excipient are present in weight ratio from about 1:0.2 to about 1:95.

The present invention further relates to an orally disintegrating dosage form comprising apixaban or a pharmaceutically acceptable salts or prodrugs thereof in an amount from about 0.5% w/w to about 50% w/w of total composition and one or more pharmaceutically acceptable excipients.

An another aspect of the invention is to provide an orally disintegrating dosage form comprising apixaban or a pharmaceutically acceptable salt or prodrug thereof in an amount from about 0.5% w/w to about 50% w/w of total composition, at least one disintegrating excipient in an amount from about 0.5% w/w to about 95% w/w of total composition and optionally one or more pharmaceutically acceptable excipients thereof.

The present invention relates to an orally disintegrating dosage form comprising apixaban or a pharmaceutically acceptable salts or prodrugs thereof and at least one disintegrating excipient wherein the weight ratio of apixaban to disintegrating excipient is from about 1:0.2 to about 1:95 wherein the dosage form at pH from 6.5 to 7.5 exhibits at least one of the following dissolution profile;
  (i) after 5 minutes, at least about 55% of the apixaban content is dissolved; and
  (ii) after 30 minutes, more than about 80% of the apixaban content is dissolved,
wherein the dissolution profile is determined using Apparatus 2 as described in Chapter 711 (Dissolution) of the US Pharmacopeia by placing the dosage form in 900 ml dissolution media under the suitable pH conditions, at 37° C. and stirring at 50 revolutions per minute.

The present invention relates to an orally disintegrating dosage form comprising apixaban or a pharmaceutically acceptable salt or prodrug thereof and at least one disintegrating excipient wherein the weight ratio of apixaban to disintegrating excipient is from about 1:0.2 to about 1:95 wherein the dosage form upon oral administration provides plasma concentration ($C_{max}$) of apixaban from about 90 ng/ml to about 275 ng/ml and total drug exposure ($AUC_{0-t}$) of apixaban from about 800 ng·hr/ml to about 2400 ng·hr/ml.

The present invention further relates to an orally disintegrating dosage form comprising apixaban or a pharmaceutically acceptable salt or prodrug thereof wherein the dosage form has disintegration time of less than about 3 minutes or less than about 2 minutes, preferably less than about 1 minute. More preferably, the dosage form has disintegration time of less than about 60, 55, 50, 40, 35, 30, 25, 20, 15 or 10 seconds.

The present invention further relates to an orally disintegrating dosage form comprising apixaban or a pharmaceutically acceptable salt or prodrug thereof wherein the dosage form has a hardness of about 10N to about 200N, preferably about 15N to about 150N, preferably about 30N to about 110N, more preferably about 40 to about 90N.

An another aspect of the invention is to provide an orally disintegrating dosage form comprising apixaban or a pharmaceutically acceptable salt or prodrug thereof in an amount from about 0.5% w/w to about 50% w/w of total composition and at least one disintegrating excipient in an amount from about 0.5% w/w to about 95% w/w of total composition wherein the dosage form has hardness of about 10N to about 200N and friability of less than about 1% wherein the dosage form has disintegration time of less than about 3 minutes or less than about 2 minutes, preferably less than about 1 minute. More preferably, the dosage form has disintegration time of less than about 60, 55, 50, 40, 35, 30, 25, 20, 15 or 10 seconds.

In an another aspect, an orally disintegrating dosage form of the present invention can be formulated using micronized, unmicronized or mixture of micronized and unmicronized apixaban or a pharmaceutically acceptable salts or prodrugs thereof and using direct compression, wet granulation, dry granulation method or like thereof.

The present invention further relates to an orally disintegrating pharmaceutical dosage form according to any preceding claims comprising about 0.5% w/w to about 50% w/w of apixaban; about 0.5% w/w to about 95% w/w of disintegrating excipient; about 1% w/w to about 90% w/w of diluent; about 1% w/w to about 90% w/w of binder; about 0.01% w/w to about 5% w/w lubricant; about 0.01% w/w to about 5% w/w glidant; about 0.01% w/w to about 5% w/w sweetener; about 0.1% w/w to about 1.0% w/w flavouring agent; about 0.001% w/w to about 10% w/w surfactant.

The present invention further relates to process for preparing orally disintegrating dosage form of apixaban or a pharmaceutically acceptable salt or prodrug thereof comprising directly compressing the dry mixture of apixaban or a pharmaceutically acceptable salt or prodrug thereof and one or more excipient or granulating the drug-excipient mixture either by wet granulation or dry granulation technique followed by compression of granules.

In a yet another aspect, the invention relates to a method of treatment of thromboembolic disorder selected from the group comprising arterial and venous cardiovascular thromboembolic disorders and thromboembolic disorders of the heart wherein the thromboembolic disorder is selected from deep vein thrombosis, deep vein thrombosis following hip or knee replacement surgery, venous thrombosis, arterial embolism, pulmonary embolism, peripheral artery disease, venous thromboembolic events in adults who have undergone elective hip or knee surgery, non-valvular arterial fibrillation, reduction of risk of stroke and systemic embolism in non-valvular atrial fibrillation by administering effective amount of orally disintegrating dosage form comprising apixaban or a pharmaceutically acceptable salt or prodrug thereof to the patient.

BRIEF DESCRIPTION OF THE DRAWINGS

FIG. 1: Comparative dissolution profile of apixaban (5 mg) orally disintegrating tablet and film-coated immediate release tablets ELIQUIS® of at pH 6.8

FIG. 2: Comparative dissolution profile of apixaban (5 mg) orally disintegrating tablet and film-coated immediate release tablets ELIQUIS® of at pH 4.5

FIG. 3: Comparative dissolution profile of apixaban (5 mg) orally disintegrating tablet and film-coated immediate release tablets ELIQUIS® of at pH 1.2

FIG. 4: Linear and semi-logarithmic plots of mean plasma concentration (MPC) versus time (t) for Apixaban orally disintegrating tablet (T1: Without water) compared to ELIQUIS®

FIG. 5: Linear and semi-logarithmic plots of mean plasma concentration (MPC) versus time (t) for Apixaban orally disintegrating tablet (T2: With water) compared to ELIQUIS®

FIG. 6: Comparative linear plot of mean plasma concentration (MPC) versus time (t) for Apixaban orally disintegrating tablet (T1: Without water; T2: With water & R: ELIQUIS®)

FIG. 7: Comparative semi-logarithmic plot of mean plasma concentration (MPC) versus time (t) for Apixaban orally disintegrating tablet (T1: Without water; T2: With water & R: ELIQUIS®)

DETAILED DESCRIPTION OF THE INVENTION

The following definitions are provided to facilitate understanding of certain terms used throughout the specification. The following paragraphs detail various embodiments of the invention. It is specifically intended that any particular feature described individually in any of these paragraph can be combined with one or more other features of the invention described in other paragraphs. The skilled person will appreciate that the invention extends to such combinations of features and that these have not been recited in detail here in the interests of brevity.

The present invention relates to an orally disintegrating pharmaceutical dosage forms of apixaban or a pharmaceutically acceptable salt or prodrug thereof. Specifically, the present invention relates to a stable orally disintegrating tablets comprising apixaban, at least one disintegrating excipient and one or more pharmaceutically acceptable excipients.

The term "Apixaban" as used herein is defined to mean apixaban as its base or pharmaceutically acceptable salts or solvates or non-solvates or prodrugs or ester or metabolite or analog or isomer or polymorph or pre-mix thereof. Any of these said forms can be crystalline or amorphous.

As used herein, the term "pharmaceutically acceptable" refer to those compounds, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

As used herein, the term "pharmaceutically acceptable salts" refer to derivatives of the apixaban wherein the apixaban is modified by making acid or base salts thereof. Examples of pharmaceutically acceptable salts include, but are not limited to, mineral or organic salts of basic residues such as amines, alkali or quarternary ammonium salts or organic salts of acidic residues such as carboxylic acids and the like thereof. Further, the pharmaceutically acceptable salts include the conventional non-toxic salts or the quaternary ammonium salts. The conventional non-toxic salts include inorganic or organic acids, for example those derived from inorganic acids such as hydrochloric, hydrobromic, sulfuric, sulfamic, phosphoric, nitric and the like thereof; and the salts prepared from organic acids such as acetic, propionic, succinic, glycolic, stearic, lactic, malic, tartaric, citric, ascorbic, pamoic, maleic, hydroxymaleic, phenylacetic, glutamic, benzoic, salicyclic, sulfanilic, 2-acetoxybenzoic, fumaric, toluenesulfonic, methanesulfonic, ethane disulfonic, oxalic, isethionic, and the like thereof.

As used herein, the term "prodrugs" are intended to include any covalently bonded carriers that release an active parent drug of the present invention in vivo when such prodrug is administered to a mammalian subject. Prodrugs as per the present invention are prepared by modifying functional groups present in the compound in such a way that the modifications are cleaved, either in routine manipulation or in vivo, to the parent compound. Prodrugs include compounds of the present invention wherein a hydroxy, amino, or sulfhydryl group is bonded to any group that, when the prodrug of the present invention is administered to a mammalian subject, it cleaves to form a free hydroxyl, free amino, or free sulfhydryl group, respectively. Examples of prodrugs include, but are not limited to, acetate, formate, and benzoate derivatives of alcohol and amine functional groups in the compounds of the present invention.

As used herein, the term "therapeutically effective amount" refers to the amount of apixaban or a pharmaceutically acceptable salt or prodrug thereof contained in the composition administered is of sufficient quantity to achieve the intended use, in this case, to treat the patient with thromboembolic disorders.

The term "orally disintegrating" refers to a composition which disintegrates within 3 minutes in water at (37±2° C.), as determined according to the disintegration test disclosed in the European Pharmacopoeia, preferably within 2 minute or preferably within 1 minute, more preferably within 30 seconds.

The term "orally disintegrating tablet" (ODT) is interchangeable with the term "rapidly disintegrating tablet" (RDT) or with the term "orodispersible tablets". It refers to a solid dosage form composed of a tablet that is designed to disintegrate or dissolve rapidly in the oral cavity when in contact with saliva without the need for chewing the tablets or swallowing with liquids. Preferred orally disintegrating tablets have the characteristics set forth by the U.S. Food & Drug Administration in Guidance for Industry: Orally Disintegrating Tablets (Dept. of Health and Human Services, U.S. FDA Center for Drug Evaluation and Research, December 2008). Generally, the preferred tablets of the invention exhibit in vitro disintegration times of 30 seconds or less when evaluated using the USP Disintegration Test described in USP 24-NF 19 or an equivalent alternative test.

The term "stable" means a drug substance and/or pharmaceutical composition for pharmaceutical use which remains stable as per ICH guidelines.

The term "ICH guidelines" means composition remains stable at 25° C./60%±5% RH, 30° C./65%±5% RH, and 40° C./75%±5% RH conditions for a time period of at least 6 months.

As used herein, the terms "about" and "approximately" should be understood to mean within an acceptable range for the particular value as determined by one of ordinary skilled in the art, which will depend in part on how the value is measured or determined, i.e., the limitations of the measurement system. For example, "about" can mean a range of up to 30%, preferably up to 20%, preferably up to 10%, and more preferably still up to 1% of a given value.

As used herein, the term "at least one disintegrating excipient" or "disintegrant" or "disintegrating agent" refers to any inactive excipient which cause a rapid break-up of solid dosage forms when they come into contact with moisture. The disintegrating excipient may include a portion which acts as disintegrating agent and another portion may contain one or more of additional excipient selected from the group consisting of diluent, binder, surfactant, lubricant, glidant or a like thereof. In context of the composition of present invention disintegrating excipient is considered to include whole mixture of disintegrating agent and other excipient mixed or co-processed with it.

The term "friability" as used herein refers to the percentage of weight loss of powder from the surface of the tablets due to mechanical action. The test of friability is carried out as per the guidelines of the European Pharmacopeia (Ph. Eur. 6.0, pp. 278-279). A maximum loss of mass not greater than 1.0% is considered acceptable for most products.

As used herein, the terms "bioequivalence" is defined as a pharmacokinetic (PK) comparison of the present pharmaceutical composition to that of the approved formulation. The pharmaceutical composition of the present invention must display drug pharmacokinetics that fall within a range of 80-125% (0.8-1.25) when one computes the ratio of the drug PK of the present invention composition with respect to approved marketed formulation. The PK parameters that are used for this comparison are the maximum concentration achieved in the blood (Cmax) and the area-under-the-curve (AUC). The AUC is determined by plotting the concentration of the active ingredient in the blood over time. It is accepted that if the present invention composition PK falls within the 80-125% range when compared to the approved marketed drug formulation PK then it is considered as bioequivalent dosage form.

The orally disintegrating dosage forms in the present invention include but not limited to tablets, mini-tablets, pellets, granules, powders, films, beads, sachets, cachets; troches; lozenges, wafers, tablets in capsules or a like thereof. The orally disintegrating tablet is a drug dosage form designed to be dissolved/disintegrate rapidly within the oral cavity. Orally disintegrating tablets include sublingual tablets and buccal tablets, the former are placed under the tongue and the latter are placed in the buccal pouch, and allowed to be dissolved in saliva.

In one embodiment, the orally disintegrating dosage form of the present invention has disintegration time of less than about 3 minutes, preferably less than about 2 minutes, or more preferably less than about 1 minute. In a particular embodiment, the orally disintegrating dosage form of the invention have a disintegration time of less than about 60, 55, 50, 45, 40, 35, 30, 25, 20, 15 or 10 seconds. The rapid disintegration in the mouth makes it possible for a patient to be administered apixaban without the need for to simultaneously drink liquid in order to ingest the formulation. Additionally, the rapid disintegration allows the apixaban to be more easily taken into the body by patients, particularly in paediatric and elderly patients as well as other patients that may have difficulty swallowing (e.g. patients who have suffered a stroke).

In an embodiment, the orally disintegrating pharmaceutical dosage form of the present invention comprises a therapeutically effective amount of apixaban or a pharmaceutically acceptable salt or a prodrug thereof and at least one disintegrating excipient wherein the dosage form has hardness of about 10N to about 200N and a disintegration time of less than 3 minutes.

In another embodiment, the orally disintegrating dosage form of the present invention has hardness from about 10N to about 200N. Particularly, the tablet has hardness from about 15N to about 150N, preferably from about 30N to about 110N, or more preferably from about 40 to about 90N.

In a more preferred embodiment, the tablet of the invention has a hardness of from about 10N to about 200N, preferably from about 15N to about 150N preferably from about 30N to about 110N, or more preferably from about 40N to about 90N.

In one embodiment, the orally disintegrating pharmaceutical dosage form of the present invention includes a therapeutically effective amount of apixaban or a pharmaceutically acceptable salt or a prodrug thereof and at least one disintegrating excipient characterized in that the weight ratio of apixaban to disintegrating excipient is from about 1:0.2 to about 1:95, preferably from about 1:5 to about 1:60, or more preferably from about 1:10 to about 1:40.

In one embodiment, the orally disintegrating compositions comprising apixaban in an amount from about 0.5% w/w to about 50% w/w, preferably about 2% w/w to about 20% w/w, or more preferably about 2.5% w/w to about 15% w/w.

In yet another embodiment, the orally disintegrating pharmaceutical dosage form of the present invention include at least one disintegrating excipient in amount from about 0.5% w/w to about 95% w/w of total composition, preferably from about 5% w/w to about 90% w/w, preferably from about 10% w/w to about 80% w/w or more preferably from about 15% w/w to about 70% w/w of total composition.

In yet another embodiment, the orally disintegrating pharmaceutical dosage form of the present invention include a therapeutically effective amount of apixaban or a pharmaceutically acceptable salt or a prodrug thereof in an amount from about 0.5% w/w to about 50% w/w of total composition, at least one disintegrating excipient in an amount from about 0.5% w/w to about 95% w/w of total composition and optionally one or more pharmaceutically acceptable excipients thereof wherein apixaban and disintegrating excipient are in the weight ratio from about 1:0.2 to about 1:95.

Apixaban in the present invention is usually administered in therapeutically effective amount from about 1.0 mg to 50 mg, preferably from 2.0 mg to 30 mg and more preferably from about 2.5 mg to 20 mg into the patients suffering from thromboembolic disorders.

In another embodiment, the orally disintegrating pharmaceutical compositions has total weight in amount from about 12.5 mg to about 1000 mg, preferably from about 50 mg to about 500 mg and more preferably about 80 mg to 300 mg.

In another embodiment, the orally disintegrating pharmaceutical dosage form of the present invention comprises apixaban having a particles with $D_{90}$ from about 1 to about 500 μm. The range of particle sizes preferred for use in the invention is $D_{90}$ from about 10 to about 400 μm, more preferably from about 25 to about 300 μm, most preferably from about 50 to about 200 μm. The particle size distribution of apixaban particles may be measured using any technique known in the art, e.g. by microscopy or light scattering equipment such as a Malvern Zetasizer equipment.

The orally disintegrating pharmaceutical dosage forms of the present invention are also suitable for nasogastric delivery to a patient. Nasogastric delivery requires the constituents of the tablet to be suspendable or soluble in water so that the tablet contents may be administered to the patient through a nasogastric tube.

It is also important that orally disintegrating dosage form maintain an acceptable rate of disintegration following storage. Disintegration time for orally disintegrating pharmaceutical dosage form may be detrimentally affected by a number of factors, including exposure to gases, moisture, and light. Orally disintegrating pharmaceutical dosage form may be administered to patients for many months following their initial preparation, and the orally disintegrating pharmaceutical dosage form of the invention have been found to maintain an acceptable disintegration time following storage.

In one embodiment, the orally disintegrating pharmaceutical dosage form comprises apixaban, at least one disintegrating excipient and one or more pharmaceutically acceptable excipient.

In another embodiment, the orally disintegrating pharmaceutical dosage form comprises apixaban, at least one disintegrating excipient and one or more pharmaceutically acceptable excipient where in the said dosage form disintegrate within 180 seconds and has hardness from about 10N to 200N.

An another embodiment of the present invention include orally disintegrating pharmaceutical dosage form comprising apixaban or a pharmaceutically acceptable salt or prodrug thereof in an amount from about 0.5% w/w to about 50% w/w of total composition, at least one disintegrating excipient in an amount from about 0.5% w/w to about 95% w/w of total composition and optionally one or more pharmaceutically acceptable excipients thereof characterized in that the dosage form shows hardness of about 10N to about 200N or below and friability of less than about 1% wherein the tablet has disintegration time of less than about 3 minutes or less than about 2 minutes, preferably less than about 1 minute. More preferably, the tablet has disintegration time of less than about 60, 55, 50, 40, 35, 30, 25, 20, 15 or 10 seconds.

An another embodiment of the present invention include orally disintegrating dosage form comprising apixaban or a pharmaceutically acceptable salts or prodrugs thereof in an amount from about 0.5% w/w to about 50% w/w of total composition, at least one disintegrating excipient in an amount from about 0.5% w/w to about 95% w/w of total composition and optionally one or more pharmaceutically acceptable excipients thereof wherein the dosage form exhibits following characteristics:
a) hardness of about 10N to about 200N or below;
b) friability of less than about 1%;
c) disintegration time of less than about 3 minutes or less than about 2 minutes, preferably less than about 1 minute. More preferably, the tablet has disintegration time of less than about 60, 55, 50, 40, 35, 30, 25, 20, 15 or 10 seconds; and
d) upon oral administration dosage form provides a plasma concentration Cmax of apixaban between about 90 ng/ml to about 275 ng/ml and total drug exposure ($AUC_{0-t}$) of apixaban between about 800 ng·hr/ml to about 2400 ng·hr/ml.

In another embodiment, the orally disintegrating compositions of the invention may include one or more pharmaceutically acceptable excipients selected from diluents, binders, disintegrants/superdisintegrants, lubricants, glidants, sweeteners, flavouring agents, coloring agents, antioxidants, surfactants/solubilizers, stabilizers, solvents, plasticizers, suitable taste masking agents or like thereof.

The diluents according to the present invention include, but are not limited to, starch (maize starch, potato starch, rice starch, wheat starch, partially gelatinized starch, pregelatinized starch, and others); sugars such as lactose (e.g., lactose monohydrate, such as Fast Flo® 316, lactose anhydrous and others), dextrose, fructose, sucrose, confectioner's sugar and others; sugar alcohols (mannitol, sorbitol, xylitol, inositol, erythritol, isomalt, lactitol, maltitol and others); cellulose derivatives including carmellose (carmellose sodium, carmellose calcium), cellulose acetate, crystalline celluloses (microcrystalline cellulose, silicified microcrystalline cellulose), kaolin and powdered celluloses; inorganic diluents such as calcium carbonate, magnesium carbonate, magnesium oxide, dibasic calcium phosphate, dibasic anhydrous calcium phosphate, tribasic calcium phosphate, dicalcium phosphate, dicalcium phosphate dihydrate, calcium sulfate, sodium chloride and others; polysaccharides polymers such as dextrin, maltodextrin, ammonium alginate, pullulan and mixtures thereof; co-processed diluents comprising binary mixture of the two individual diluents mentioned in above categories. Preferably, the diluent in present invention is mannitol and lactose. The diluent may present in an amount from about 1% w/w to about 98% w/w of the composition, preferably from about 10% w/w to about 90% w/w of the composition and more preferably from about 20% w/w to about 70% w/w of the composition.

The binders according to the present invention include, but are not limited to corn starch, potato starch, pre-gelatinized starch or other starches; gelatin, natural and synthetic gums such as acacia, sodium alginate, alginic acid, other alginates, powdered tragacanth, guar gum; cellulose and its derivatives (e.g., methyl cellulose, ethyl cellulose, cellulose acetate, cellulose acetate phthalate, carboxymethyl cellulose calcium, carboxymethyl cellulose sodium, hydroxyethyl cellulose, hydroxyethyl methyl cellulose, hydroxypropyl cellulose, low-substituted hydroxypropyl cellulose, hydroxypropyl methyl cellulose in various grades, microcrystalline cellulose and others); polyvinyl pyrrolidone and its derivatives in various grades such as povidone, copovidone and others; acrylic acid polymers such as carbomers and mixtures thereof. Preferably, the binder in present invention is hydroxypropylmethylcellulose and povidone; co-processed binders comprising binary mixture of the two individual binders mentioned in above categories. The binder may be present in an amount from about 1% w/w to about 90% w/w of the composition, preferably from about 30% w/w to about 70% w/w of the composition, preferably from about 20% w/w to about 60% w/w of the composition, more preferably from about 10% w/w to about 50% w/w of the composition.

The disintegrants/superdisintegrants according to the present invention include, but not limited to cellulose derivatives such as low-substituted hydroxypropyl cellulose, microcrystalline cellulose; gums such as alginic acid, calcium carbonate, polacrilin potassium, potato or tapioca starch, corn starch, pre-gelatinized starch, sodium starch glycolate, crospovidone, croscarmellose sodium, croscarmellose calcium soy polysaccharides, calcium silicate; ion-exchange resins such as inorganic salt (e.g. sodium, potassium) of 2-Methyl-2-propenoic acid polymer with divinylbenzene, styrene-divinylbenzene copolymers and mixtures thereof, more preferably polacrilin potassium.

In another embodiment, the oral disintegrating tablet of the present invention involves use of disintegrating excipient which are co-processed with other excipient such as filler, binder or diluent or which are in the pre-mix form. These type of disintegrating excipient can provide robustness, better compressibility, optimum disintegrating time, allowing rapid dissolution, smooth mouth feeling which make them particularly suitable for use in the tablets of the invention. Some of the commercially available co-processed disintegrating excipient include, but not limited to, PEARLITOL® Flash, F-melt type C, F-melt type M, Ludiflash, GalenlQ, Prosolv, StarLac® and Pharmaburst. PEARLITOL® Flash is a spray-dried mixture of mannitol (80%) and maize starch (20%), F-melt type C is a formulation consisting of mannitol (65%), xylitol (5%), anhydrous dibasic calcium phosphate (4%), crospovidone (8%) and microcrystalline cellulose (18%). F-melt type C is formed by a co-spray drying of the above ingredients. F-melt type M is a formulation consisting of mannitol, xylitol, magnesium aluminometasilicate, crospovidone and microcrystalline cellulose. Ludiflash (BASF Fine Chemicals) is a formulation consisting of mannitol (90%), crospovidone (Kollidon CL-SF) (5%) and polyvinyl acetate (Kollicoat SR 30D) (5%). GalenlQ (Grade 721 ; Beneo-Palatinit) is a formulation comprising a disaccharide alcohol in a 3:1 ratio of 6-O-α-D-glucopyranosyl-D-sorbitol and 1-O-a-D-glucopyranosyl-D-mannitol dihydrate. Prosolv ODT G2 (JRS Pharma) is a formulation comprising microcrystalline cellulose, colloidal silicon dioxide, mannitol, fructose and crospovidone. StarLac® is a formulation comprising 85% alpha-lactose monohydrate and 15% native maize starch and Pharmaburst (SPI Pharma) is a formulation comprising mannitol, sorbitol, crospovidone, croscarmellose sodium and colloidal silicon dioxide. The co-processed disintegrating excipient is present either alone or in combination with other excipients and the preferred combination of disintegrating excipient is croscarmellose sodium and PEARLITOL® Flash. The disintegrating excipient may present in amount from about 0.5% w/w to about 95% w/w of the composition, preferably from about 2.0% w/w to about 95% w/w of the composition.

As mentioned above, the co-processed or pre-mix disintegrating excipient contains a portion which acts as disintegrating agent and another portion may contain one or more of additional excipient selected from the group consisting of diluent, binder, surfactant, lubricant, glidant or a like thereof. In context of the composition of present invention disintegrating excipient is considered to include whole mixture of disintegrating agent and other excipient mixed or processed with it.

It is known in the art that a particular excipient may have dual or multiple characteristics such as it may act as both a binder and a filler, or as a binder, a filler and a disintegrant. Hence, the orally disintegrating pharmaceutical dosage form of the present invention comprises filler, binder and disintegrant in the combined amount from about 40% w/w to about 95% w/w of total composition.

The lubricants according to the present invention include, but are not limited to magnesium stearate, glyceryl monostearates, glyceryl behenate, palmitic acid, talc, carnauba wax, calcium stearate, zinc stearate, polyoxyethylene monostearates, calcium silicate, silicon dioxide, hydrogenated vegetable oils and fats, stearic acid, sodium stearyl Fumarate, Sodium lauryl sulfate and mixtures thereof. Preferably, the lubricant in the present invention is magnesium stearate. The lubricants may present in amount from about 0.01 to about 5% w/w of the composition, preferably from about 0.5 to about 2% w/w of the composition and more preferably about 1% w/w of the composition.

The glidants according to the present invention include, but are not limited to silica such as silicon dioxide, colloidal silicon dioxide; kaolin, talc, magnesium silicate, magnesium trisilicate and mixtures thereof. Preferably, the glidant in present invention is colloidal silicone dioxide or talc. The glidants may be present in amount from about 0.01% w/w to about 5% w/w of the composition, preferably from about 0.5% w/w to about 1% w/w of the composition.

The sweeteners according to the present invention include, but are not limited to sugar alcohols like mannitol, sorbitol, xylitol, erythritol; sucralose, dextrose, fructose, maltose, trehalose, aspartame, saccharin sodium, acesulfame potassium, and mixtures thereof. Preferably, the sweeteners in the present invention includes aspartame. The sweeteners may be present in an amount from about 0.01 to about 5.0 w/w of the composition, preferably from about 0.1 to about 1% w/w of the composition.

The flavouring agents according to the present invention include, but are not limited to pharmaceutically acceptable natural oils, natural flavours, and artificial flavours. Preferably, the flavouring agents are selected from menthol, peppermint, wintergreen, orange, lemon, cherry, bubble gum, strawberry, cherry, caramel, raspberry, tutti-fruity, banana, vanilla, almond and other nuts, and the like thereof. Mixtures of two or more flavouring agents can also be used. The flavouring agents may be present in amount from about 0.1 to about 1.0 w/w of the composition.

The colouring agents according to the present invention include, but are not limited to natural colorants, synthetic colorants or like thereof. Examples of natural colorants include pigments and dyes obtained from mineral, plant, and animal sources like red ferric oxide, titanium dioxide, yellow ferric oxide, zinc oxide, indigo, and synthetic colorants include FD&C or D&C dye, an azo dye or like thereof. The coloring agents may present in the composition as per the quantity sufficient requirement, preferably from about 0.1 to about 1.0 w/w of the composition.

Antioxidants may be optionally included in the compositions of the present invention and may be present in amounts effective to retard decomposition of a drug that is susceptible to oxidation. The antioxidants according to the present application include, but are not limited to ascorbic acid and its salts, tocopherols, sulfite salts such as sodium metabisulfite or sodium sulfite, sodium sulfide, butylated hydroxyanisole, butylated hydroxytoluene, ascorbyl palmitate, propyl gallate and mixtures thereof. The antioxidants may present in amount from about 0.001% w/w to about 10% w/w of the composition.

The surfactants/solubilizers may be optionally included in the compositions of the present invention include, but are not limited to cetostearyl alcohol, lecithin, cholesterol, medium-chain glyceride, diethanolamine, ethyl oleate, ethylene glycol palmitostearate, glycerin, glyceryl monostearate, glyceryl monooleate, polyoxyethylene castor oil glycoside, isopropyl myristate, monoethanolamine, oleic acid, propylene glycol, polyethylene alkyl ether, sodium lauryl sulfate, polyoxyethylene sorbitan fatty acid ester, sodium docusate, sorbic acid, sorbitan fatty acid ester, polyoxyethylene alkyl ether, polyethylene sorbitan fatty acid ester, polyoxyethylene stearate, propylene glycol alginate, sorbitan fatty acid ester, stearic acid, sunflower oil, triethanolmine, and mixtures thereof. The surfactants/solubilizers may present in amount from about 0.001% w/w to about 10% w/w of the composition.

The stabilizers according to the present invention include, but are not limited to citric acid, benzoic acid, sodium benzoate, and the like. The stabilizers may present in amount from about 0.001% w/w to about 10% w/w of the composition.

The solvents for the purpose of film coating/granulation according to the present invention include, but are not limited to water, methanol, ethanol, acetone, diacetone, polyols, polyethers, oils, esters, alkyl ketones, methylene chloride, isopropyl alcohol, butyl alcohol, methyl acetate, ethyl acetate, isopropyl acetate, castor oil, ethylene glycol monoethyl ether, diethylene glycol monobutyl ether, diethylene glycol monoethyl ether, dimethylsulfoxide, N,N-dimethylformamide, tetrahydrofuran, and any mixtures thereof.

In another embodiment, the compositions of the present invention comprises apixaban particles (e.g., crystals), coated with a taste-masking layer to improve palatability of the composition. The taste-masking layer can be applied to the apixaban particles by any suitable method, for example microencapsulation, coacervation phase separation or fluidized bed coating methods.

The taste-masking polymers according to present invention include, but are not limited to water-soluble polymers, water-insoluble polymers, or like thereof. Examples of polymers include ethylcellulose, cellulose acetate, cellulose acetate butyrate, pullulan, methacrylate copolymers available under the trade name of Eudragit (type RL, RS and NE30D), maltrin, an aminoalkyl methacrylate copolymer available under the trade name of Eudragit (type E100 or EPO), polyvinylacetal diethylaminoacetate, sodium chloride, sucrose, povidone and mixtures thereof. The taste-masking polymers may be present in an amount from about 5 to about 70% w/w of the composition, preferably from about 10% w/w to about 40% w/w of the composition.

The plasticizers according to the present invention include, but are not limited to, triacetin, tributyl citrate, triethyl citrate, acetyl tri-n-butyl citrate, polyethylene glycol, polypropylene glycol, diethyl phthalate, castor oil, dibutyl sebacate, acetylated monoglycerides and the like or mixtures thereof. The plasticizer may typically present in amount from about 10% w/w to about 30% w/w based on the weight of dry polymer.

The compositions of the present invention may be coated with one or more layers of membrane coating materials for sealing purposes, as per the process known in the art. An outer coating may also include one or more colorants to provide a colored dosage form as desired and/or to improve the taste of the tablet. These coatings may be sugar coatings, film coatings, color coatings, or the like thereof.

The dosage forms herein, e.g., orally disintegrating tablets, can be of any suitable size and shape, and the invention is not limited in this regard. For example, the dosage forms may be of triangular, round, rectangular, square, capsule, almond, oval, diamond, biconvex, multi-layered, or have an irregular shape. There may also be letters or characters embossed or printed on the dosage form surface.

The compositions of the present invention can also be adapted for sublingual or buccal administration. In the former case, somewhat smaller and/or flatter dosage forms may be desirable e.g. a thin film, or an orally disintegrable dosage form as otherwise provided herein may suffice without modifications made to size or shape. For buccal administration, the dosage form may be a tablet or film and will adhere to the oral mucosa, e.g., the gum, and, for that purpose, will contain at least one component that facilitates adhesion to the buccal mucosa until drug is released and/or dosage form disintegrates (which preferably occur roughly simultaneously). Such components are typically hydrophilic, water-swellable polymers that adhere to the wet surface of the buccal mucosa and include, for instance, e.g., carbomers, hydrolyzed polyvinylalcohol, polyethylene oxides, polyacrylates, and the like.

Dissolvable films are often composed of an aqueous polymer matrix. Dissolvable film employed in buccal systems may be designed as bioerodable mono- or multi-layers systems and may feature a mucoadhesive tailored for the desired dwell time. The size of the film may be, for example, about 4 to 10 $cm^2$ with a depth of 0.1 to 4 mm.

The pharmaceutical composition of the present invention can be obtained by a known conventional methods like direct compression, wet granulation, dry granulation, roller compaction or slugging, fluidized bed granulation, rapid mixture granulation, solvent evaporation, hot-melt extrusion, freeze drying (lyophilisation), Zydis technology, molding methods, or like thereof. The wet granulation process may involve shear granulators (such as planetary mixers), high shear mixer granulators (such as Fielder or Diosna), twin screw granulators (such as ConsiGma) and Fluid Bed Granulators (such as Aeromatic or Glatt).

In one of the embodiment, the present invention include an orally disintegrating dosage form comprising apixaban or a pharmaceutically acceptable salt or prodrug thereof in amount from about 0.5% to about 50% w/w of total composition, diluent in amount from about 1% to about 98% w/w of total composition, disintegrating excipient in amount from about 0.5% to about 95% w/w of total composition, optionally binder in an amount from about 1% to about 90% w/w of total composition, surfactant in an amount from about 0.001% to about 10% w/w of total composition, lubricant in an amount from about 0.01% to about 5% w/w, glidant in an amount from about 0.01% to about 5% w/w of total composition, sweeteners in an amount from about 0.01% to about 5% w/w of total composition and flavouring agent in an amount from about 0.1% w/w to about 1% w/w of the total composition.

In an another embodiment, the present invention includes an orally disintegrating tablet comprising apixaban or a pharmaceutically acceptable salt or prodrug thereof in an amount from about 0.5% w/w to about 15% w/w of total composition, mixture of mannitol, lactose and microcrystalline cellulose as a diluent in an amount from about 40% w/w to about 95% w/w of total composition, crospovidone and starch as a disintegrating excipient in an amount from about 0.5% w/w to about 40% w/w of total composition, sodium lauryl sulfate as surfactant in an amount from about 0.5% w/w to about 2% w/w of total composition, magnesium stearate as a lubricant in an amount from about 0.5% w/w to about 2% w/w of total composition, talc as glidant in an amount from about 0.1% to about 0.5% w/w of total composition, aspartame as sweetener in an amount from about 0.1% to about 1% w/w of total composition and peppermint as flavouring agent in an amount from about 0.1% w/w to about 1% w/w of the total composition.

In an another embodiment, the present invention includes an orally disintegrating pharmaceutical dosage form comprising about 2-4% w/w apixaban; about 30-40% w/w mannitol; about 5-10% w/w starch; about 20-30% w/w lactose; about 10-20% w/w microcrystalline cellulose; about 5-15% w/w crospovidone; about 0.5-2% w/w sodium lauryl sulfate; about 0.5-5% w/w magnesium stearate; about 0.1-0.5% w/w of talc; about 0.1-2% w/w peppermint flavour; about 0.1-2% w/w aspartame.

In an another embodiment, the present invention include an orally disintegrating tablet comprising about 3.12% w/w apixaban, about 25.5% w/w lactose, about 34.3% w/w mannitol, about 8.58% w/w starch, about 15% w/w microcrystalline cellulose, about 10% w/w crospovidone, about 1% w/w sodium lauryl sulfate, about 1% w/w magnesium stearate, about 0.25% w/w of talc, about 0.75% w/w peppermint flavour, about 0.5% w/w aspartame of total composition.

In an another embodiment, an orally disintegrating pharmaceutical dosage form of the present invention comprises from about 2.5mg to about 10 mg apixaban, from about 27.44 to about 109.76 mg mannitol, from about 6.86 to about 27.44 mg starch, from about 20.4 mg to about 81.6 mg lactose, from about 12 mg to about 48 mg microcrystalline cellulose, from about 8 mg to about 32 mg crospovidone, from about 0.8 mg to about 0.32 mg sodium lauryl sulfate, from about 0.6 mg to about 2.4 mg peppermint flavour, from about 0.4 mg to about 1.6 mg aspartame, from about 0.8 mg to about 3.2 mg magnesium stearate and from about 0.2 mg to about 0.8 mg talc.

In an another embodiment, the orally disintegrating pharmaceutical dosage form of the present invention upon an oral single-dose administration exhibits a maximum plasma concentration ($C_{max}$) from about 90 to 275 ng/ml, preferably from about 110 to 250 ng/ml, more preferably from about 150-200 ng/ml. The term "$C_{max}$" refers to the maximum concentration of apixaban in the blood following an oral single dose administration of the composition of the present invention.

In an another embodiment, the orally disintegrating pharmaceutical dosage form of the present invention upon an oral single-dose administration exhibits a time to maximum plasma concentration ($T_{max}$) from about 1.6 h to about 4.7 h, preferably from about 2 h to about 3.5 h, more preferably from about 2.2 h to about 3.4 h. The term "$T_{max}$" refers to the time in hours when $C_{max}$ is achieved following an oral single-dose administration of the composition of the present invention.

The term "AUC" refers to the area under the time/plasma concentration curve after an oral single-dose administration of the composition of the present invention. $AUC_{0-\infty}$ denotes the area under the plasma concentration versus time curve from time 0 to infinity and $AUC_{0-t}$ denotes the area under the plasma concentration versus time curve from time 0 to time t.

In an another embodiment, after an oral single-dose administration, the composition of the present invention exhibits an area under the time/plasma concentration curve from time 0 to time t hours ($AUC_{0-t}$) from about 800 ng·hr/ml to about 2400 ng·hr/ml, preferably from about 1200 ng·hr/ml to about 2000 ng·hr/ml ng-h/mL, more preferably from about 1500 ng·hr/ml to about 1800 ng·hr/ml ng-h/mL.

In an another embodiment, after an oral single-dose administration, the composition of the present invention exhibits an area under the time/plasma concentration curve from time 0 to infinity ($AUC_{-\infty}$) from 800 ng·hr/ml to about 2400 ng·hr/ml, preferably from about 1200 ng·hr/ml to about 2000 ng·hr/ml ng-h/mL, more preferably from about 1500 ng·hr/ml to about 1800 ng·hr/ml ng-h/mL.

Thus, the inventors have found that the solid oral dosage forms of the invention show equivalent pharmacokinetic parameters (e.g. $C_{max}$, $T_{max}$, $AUC_{0-t}$, $AUC_{-\infty}$ and $T_{1/2}$) on bioavailability of apixaban, to that of apixaban of the reference's product ELIQUIS®, as set out in the European medicines Agency (EMA) "Guideline on the investigation of bioequivalence" (EMA CPMP/EWP/QWP/1401/98 Rev. 1/Corr**). Thereby, the solid oral dosage forms of the present invention can be considered bioequivalent to the single dose administration of ELIQUIS® according to the guidelines on the European medicines Agency (EMA).

In yet another embodiment of the present invention, the pharmaceutical composition remains stable for longer period of time in different thermo-hygrostats 25° C./60%±5% RH, 30° C./65%±5% RH, and 40° C./75%±5% RH as per ICH guidelines.

According to another aspect of the invention, the orally disintegrating pharmaceutical compositions of the present invention can be prepared by wet granulation method comprising the steps of: i) preparing a mixture containing apixaban or a pharmaceutically acceptable salt or prodrug thereof and at least one pharmaceutical excipient, ii) granulating the mixture obtained in step (i) with a granulation liquid to form a wet granulate, iii) drying the wet granulate obtained in step (ii) to form a dry granulate, iv) optionally mixing the granulate obtained in step (iii) with a pharmaceutical excipient, and v) subjecting the granulate obtained in step (iii) or the mixture obtained in step (iv) to compression.

According to one more aspect, the orally disintegrating pharmaceutical compositions of the present invention can be prepared by direct compression method comprising the steps of: i) preparing a powder mixture containing apixaban or a pharmaceutically acceptable salt or prodrug thereof and pharmaceutical excipients, and ii) subjecting the powder mixture obtained in step (i) to compression.

According to one more aspect, the orally disintegrating pharmaceutical compositions of the present invention can be prepared by dry granulation method comprising the steps of:

i) preparing a powder mixture containing apixaban or a pharmaceutically acceptable salt or prodrug thereof and at least one pharmaceutical excipient, ii) compacting the powder mixture obtained in step (i) to form a compact/slug/ribbon, iii) converting the compact/slug/ribbon obtained in step (ii) into a granulate, iv) optionally mixing the granulate obtained in step (iii) with a pharmaceutical excipient, and v) subjecting the granulate obtained in step (iii) or the mixture obtained in step (iv) to compression.

According to one more aspect, the orally disintegrating pharmaceutical compositions of the present invention can be prepared by fluid bed granulation a process comprising the steps of: (i) preparing a dry mixture of apixaban or a pharmaceutically acceptable salt or prodrug thereof with one or more pharmaceutical excipients, (ii) followed by solvent spray onto the powder for the granulation purpose, (iv) blending the obtained granules with extra-granular excipients and lubricating the blend, (v) at last compressing the blend obtained to form a tablet composition and (vi) optionally coating the said composition.

As per yet another embodiment, the pharmaceutical composition of the present invention can be used in the treatment by administering to the patient having thromboembolic disorders selected from the group comprising arterial and venous cardiovascular thromboembolic disorders and thromboembolic disorders of the heart wherein the thromboembolic disorder is selected from deep vein thrombosis, deep vein thrombosis following hip or knee replacement surgery, venous thrombosis, arterial embolism, pulmonary embolism, peripheral artery disease, venous thromboembolic events in adults who have undergone elective hip or knee surgery, non-valvular arterial fibrillation, reduction of risk of stroke and systemic embolism in non-valvular atrial fibrillation by administering effective amount of orally disintegrating tablet of comprising apixaban or a pharmaceutically acceptable salt or prodrug thereof and at least one disintegrating excipient in a weight ratio from about 1:0.2 to about 1:95.

The present invention is illustrated below by reference to the following examples. However, one skilled in the art will appreciate that the specific methods and results discussed are merely illustrative of the invention, and not to be construed as limiting the invention, as many variations thereof are possible without departing from the spirit and scope of the invention.

EXAMPLES

Example 1: Evaluation of Disintegrating Excipient

Disintegration is one of the important characteristic for an orally dispersible tablet. This example evaluated qualitative and quantitative effect of different disintegrants on the orodispersible tablet of the present invention.

For the purpose of this study, orodispersible compositions of Apixaban with different concentration of sodium carmellose and with other disintegrant were prepared and compared. The concentration of sodium carmellose (in concentration range from 0.25% to 15%; A1 to A7), ion-exchange resin and crospovidone were evaluated for its effect on disintegration time, dissolution and hardness.

TABLE 1

| Disintegrants in tablet batches | | | | | | | |
|---|---|---|---|---|---|---|---|
| Component | A1 | A2 | A3 | A4 | A5 | A6 | A7 |
| Apixaban | 5 | 5 | 5 | 5 | 5 | 5 | 5 |
| Mannitol | 54.56 | 54.56 | 54.56 | 54.56 | 54.56 | 54.56 | 54.56 |
| Starch | 13.64 | 13.64 | 13.64 | 13.64 | 13.64 | 13.64 | 13.64 |
| Lactose | 57.2 | 56.8 | 55.2 | 52.8 | 46.4 | 38.4 | 33.6 |
| Microcrystalline Cellulose | 24.00 | 24.00 | 24.00 | 24.00 | 24.00 | 24.00 | 24.00 |
| Sodium carmellose | 0.4 | 0.8 | 2.4 | 4.8 | 11.2 | 19.2 | 24.0 |
| Sodium Lauryl sulphate | 1.6 | 1.6 | 1.6 | 1.6 | 1.6 | 1.6 | 1.6 |
| Flavour | 0.8 | 0.8 | 0.8 | 0.8 | 0.8 | 0.8 | 0.8 |
| Aspartame | 0.8 | 0.8 | 0.8 | 0.8 | 0.8 | 0.8 | 0.8 |
| Magnesium stearate | 1.6 | 1.6 | 1.6 | 1.6 | 1.6 | 1.6 | 1.6 |
| Talc | 0.4 | 0.4 | 0.4 | 0.4 | 0.4 | 0.4 | 0.4 |
| Core weight | 160.00 | 160.00 | 160.00 | 160.00 | 160.00 | 160.00 | 160.00 |

| Component | A8 | A9 | A10 | A11 |
|---|---|---|---|---|
| Apixaban | 5 | 5 | 5 | 5 |
| Mannitol | 54.88 | 54.88 | 84.20 | 122.4 |
| Starch | 13.72 | 13.72 | — | 30.6 |
| Lactose | 40.8 | 40.8 | 61.6 | — |
| Microcrystalline Cellulose | 24.00 | 24.00 | — | — |
| Sodium carmellose | — | — | 4.0 | — |
| Crospovidone | 16.00 | — | — | — |
| Ion-exchange resin | — | 16.00 | — | — |
| Sodium Lauryl sulphate | 1.6 | 1.6 | 1.6 | — |
| Flavour | 1.2 | 1.2 | 0.8 | — |
| Aspartame | 0.8 | 0.8 | 0.8 | — |
| Magnesium stearate | 1.6 | 1.6 | 1.6 | 1.6 |
| Talc | 0.4 | 0.4 | 0.4 | 0.4 |
| Core weight | 160.00 | 160.00 | 160.00 | 160.00 |

All values are in mg/tablet

Following experimental batches of orally disintegrating tablet of apixaban were prepared using mannitol-starch & crospovidone (A8), mannitol-starch & ion-exchange resin (A9), plain mannitol and sodium carmellose (A10) and mannitol-starch alone (A11) to evaluate their effect on disintegration time and dissolution.

Table 2 provide results of the disintegrant experiments evaluation (A1 to A11) of the orodispersible tablets.

TABLE 2

Disintegrant experiment result

| Characteristic attributes | A1 | A2 | A3 | A4 | A5 | A6 | A7 |
|---|---|---|---|---|---|---|---|
| Disintegration time (S) | 29 | 18 | 26 | 26 | 25 | 28 | 27 |
| Flowability | Good | Good | Good | Good | Good | Good | Good |
| Picking/Sticking | No | No | No | No | No | No | No |
| Average (N) | 50 | 43 | 49 | 45 | 47 | 48 | 42 |
| Friability (%) | 0.07% | 0.15% | 0.14% | 0.23% | 0.18% | 0.01% | 0.01% |
| Dissolution at 6.8 pH | | | | | | | |
| at 5 min (%) | 58 | 63 | 56 | 60 | 62 | 65 | 69 |
| at 30 min (%) | 82 | 88 | 81 | 85 | 85 | 88 | 86 |

| Characteristic attributes | A8 | A9 | A10 | A11 |
|---|---|---|---|---|
| Disintegration time (S) | 25 | 28 | 25 | 14 |
| Flowability | Good | Good | Good | Good |
| Picking/Sticking | No | No | No | No |
| Average (N) | 35 | 33 | 44 | 47 |
| Friability (%) | 0.03% | 0.09% | 0.23% | 0.34% |
| Dissolution at 6.8 pH | | | | |
| at 5 min (%) | 63 | 55 | 45 | 65 |
| at 30 min (%) | 83 | 80 | 65 | 90 |

The orally disintegrating tablets prepared using Sodium carmellose in concentration range from 0.25% w/w to 15% w/w showed optimum disintegration time (18-29 seconds), hardness (42-50 N), dissolution of at least about 55% at 5 min and more than about 80% at 30 minutes.

The orally disintegrating tablets of experiments A1 to A7 also showed less than 1% friability and the powder mixture had good flow property without any sticking or picking concern.

The orally disintegrating tablets prepared using formula of A8 & A9 showed optimum disintegration time (25-28 seconds), hardness (33-35 N), dissolution of at least about 55% at 5 minutes and more than about 80% at 30 minutes.

However, orally disintegrating tablet of A10 did not achieved desired dissolution profile. Formulation of A11 showed more rapid disintegration time and higher dissolution at 5 & 30 minutes interval.

The orally disintegrating tablets of experiments A8 to A11 also showed less than 1% friability and the powder mixture had good flow property without any sticking or picking concern.

Example 2: Evaluation of Apixaban: Disintegrating Excipient Weight Ratio

Apixaban to disintegrating excipient weight ratios were evaluated for its effect on disintegration and dissolution time. Orally disintegrating tablets with apixaban to disintegrating excipient weight ratios from 1:0.1 to 1:96 were prepared (A12 to A21) and evaluated.

TABLE 3

Apixaban:Disintegrating excipient weight ratio batches

| Component | A12 | A13 | A14 | A15 | A16 | A17 | A18 | A19 | A20 | A21 |
|---|---|---|---|---|---|---|---|---|---|---|
| Apixaban | 5 | 5 | 5 | 5 | 5 | 5 | 5 | 5 | 5 | 5 |
| Mannitol - Starch (Pearlitol Flash ®) | 0.5 | 5 | 35 | 25 | 25 | 50 | 200 | 360 | 475 | 480 |
| Lactose | 124.9 | 14.4 | 90.4 | 14.4 | 120.4 | 120.04 | 120.04 | 120.04 | 120.04 | 120.04 |
| Sodium Lauryl sulphate | 1.6 | 1.6 | 1.6 | 1.6 | 1.6 | 1.6 | 1.6 | 1.6 | 1.6 | 1.6 |
| Flavour | 1.2 | 1.2 | 1.2 | 1.2 | 1.2 | 1.2 | 1.2 | 1.2 | 1.2 | 1.2 |
| Aspartame | 0.8 | 0.8 | 0.8 | 0.8 | 0.8 | 0.8 | 0.8 | 0.8 | 0.8 | 0.8 |

TABLE 3-continued

| Apixaban:Disintegrating excipient weight ratio batches | | | | | | | | | | |
|---|---|---|---|---|---|---|---|---|---|---|
| Component | A12 | A13 | A14 | A15 | A16 | A17 | A18 | A19 | A20 | A21 |
| Magnesium stearate | 1.6 | 1.6 | 1.6 | 1.6 | 1.6 | 1.6 | 1.6 | 1.6 | 1.6 | 1.6 |
| Talc | 0.4 | 0.4 | 0.4 | 0.4 | 0.4 | 0.4 | 0.4 | 0.4 | 0.4 | 0.4 |
| Core weight | 136.00 | 30.00 | 136.00 | 50.00 | 156.00 | 181.00 | 331.00 | 491.00 | 606.00 | 611.00 |
| weight ratio | 1:0.1 | 1:1 | 1:1 | 1:5 | 1:5 | 1:10 | 1:40 | 1:60 | 1:95 | 1:96 |

Table 4 provides results of the Apixaban:Disintegrating excipient weight ratio experiments evaluation (A12 to A21) of the orodispersible tablets.

TABLE 4

| Apixaban:Disintegrating excipient weight ratio experiment result | | | | | | | | | | |
|---|---|---|---|---|---|---|---|---|---|---|
| Characteristic attributes | A12 | A13 | A14 | A15 | A16 | A17 | A18 | A19 | A20 | A21 |
| Disintegration time (S) | 215 | 23 | 25 | 29 | 27 | 25 | 24 | 28 | 29 | 189 |
| Flowability | Poor | Good | Good | Good | Good | Good | Good | Good | Good | Good |
| Picking/Sticking | No | No | No | No | No | No | No | No | No | No |
| Average (N) | 45 | 18 | 51 | 29 | 55 | 49 | 55 | 63 | 75 | 125 |
| Friability (%) | 0.23% | 0.57% | 0.39% | 0.23% | 0.19% | 0.15% | 0.15% | 0.13% | 0.17% | 0.25% |
| Dissolution at 6.8 pH | | | | | | | | | | |
| at 5 min (%) | 45 | 58 | 56 | 59 | 63 | 57 | 55 | 58 | 60 | 25 |
| at 30 min (%) | 60 | 83 | 80 | 83 | 91 | 87 | 81 | 86 | 85 | 55 |

Orally disintegrating tablet prepared using formula using 1:0.1 (A12) & 1:96 (A21) apixaban:disintegrating excipient ratio did not show disintegration time and dissolution in optimum limit. However, orally disintegrating tablet prepared using apixaban:disintegrating excipient ratio of 1:1 to 1:95 (A13 to A20) showed optimum disintegration time (23-28 seconds), hardness (18-75 N), dissolution of at least about 55% at 5 minutes and more than about 80% at 30 minutes.

Example 3: Evaluation of Effect of API Loading on Disintegration Time and Dissolution Orally disintegrating tablets of apixaban were prepared using 0.5% w/w to 25% w/w of apixaban content and evaluated for disintegration time, hardness and dissolution time.

TABLE 5

| API loading experiment batches | | | | | | | | | | |
|---|---|---|---|---|---|---|---|---|---|---|
| Component | A22 | A23 | A24 | A25 | A26 | A27 | A28 | A29 | A30 | A31 |
| Apixaban | 2.5 | 5 | 5 | 5 | 5 | 5 | 5 | 5 | 10 | 10 |
| Mannitol + Starch (Pearlitol Flash ®) | 205 | 205 | 68.60 | 50.6 | 40.5 | 30.38 | 25.3 | 12.65 | 25.3 | 20.26 |
| Lactose | 162.5 | 160 | 40.80 | 28 | 21.440 | 14.83 | 11.5 | 3.25 | 6.5 | 3.15 |
| Microcrystalline Cellulose | 66.5 | 66.5 | 24.00 | 13.3 | 10.600 | 7.95 | 6.65 | 3.325 | 6.65 | 5.35 |
| Crospovidone | 48 | 48 | 16.0 | — | — | — | — | — | — | — |
| Soduim Lauryl sulphate | 4.8 | 4.8 | 1.6 | 0.96 | 0.76 | 0.57 | 0.48 | 0.24 | 0.48 | 0.385 |
| Flavour | 2.4 | 2.4 | 1.2 | 0.48 | 0.38 | 0.285 | 0.24 | 0.12 | 0.24 | 0.19 |
| Aspartame | 2.4 | 2.4 | 0.8 | 0.48 | 0.38 | 0.285 | 0.24 | 0.12 | 0.24 | 0.19 |
| Magnesium stearate | 4.8 | 4.8 | 1.6 | 0.96 | 0.76 | 0.57 | 0.48 | 0.24 | 0.48 | 0.385 |
| Talc | 1.1 | 1.1 | 0.4 | 0.22 | 0.18 | 0.13 | 0.11 | 0.055 | 0.11 | 0.09 |
| Core weight | 500 | 500 | 160 | 100 | 80 | 60 | 50 | 25 | 50 | 40 |
| % w/w of API | 0.5% | 1% | 3.12% | 5% | 6.25% | 8.33% | 10% | 20% | 20% | 25% |

All values are in mg/tablet

Table 6 provides Apixaban API loading experiment evaluation (A22 to A31) of the orodispersible tablets.

Orally disintegrating tablet prepared using formula using 0.5% w/w to 25% w/w of apixaban (A22 to A31) showed disintegration time (22-29 seconds), hardness (23-75N) and dissolution of at least about 55% at 5 minutes and more than about 80% at 30 minutes.

The orally disintegrating tablets of experiments A22 to A31 also showed less than 1% friability and the powder mixture had good flow property without any sticking or picking concern.

TABLE 6

Apixaban API loading experiment result

| Characteristic attributes | A22 | A23 | A24 | A25 | A26 | A27 | A28 | A29 | A30 | A31 |
|---|---|---|---|---|---|---|---|---|---|---|
| Disintegration time (S) | 29 | 26 | 22 | 29 | 25 | 25 | 24 | 28 | 24 | 29 |
| Flowability | Good | Good | Good | Good | Good | Good | Good | Good | Good | Good |
| Picking/Sticking | No | No | No | No | No | No | No | No | No | No |
| Hardness (N) | 75 | 83 | 55 | 45 | 44 | 52 | 31 | 23 | 43 | 39 |
| Friability (%) | 0.23% | 0.19% | 0.13% | 0.14% | 0.23% | 0.09% | 0.17% | 0.69% | 0.29% | 0.17% |
| Dissolution at 6.8 pH | | | | | | | | | | |
| at 5 min (%) | 58 | 57 | 65 | 61 | 59 | 58 | 60 | 55 | 62 | 58 |
| at 30 min (%) | 85 | 83 | 91 | 86 | 87 | 80 | 82 | 83 | 90 | 87 |

Example 4: Evaluation of Effect of Disintegrating Excipient Concentration on Disintegration Time and Dissolution Orally disintegrating tablets of apixaban were prepared using 0.8% w/w to 95.9% w/w of disintegrating excipient content (A32-A40) and evaluated for disintegration time, hardness and dissolution time.

TABLE 7

Disintegrating excipient content experiment batches

| Component | A32 | A33 | A34 | A35 | A36 | A37 | A38 | A39 | A40 |
|---|---|---|---|---|---|---|---|---|---|
| Apixaban | 2.5 | 5 | 5 | 5 | 5 | 5 | 5 | 5 | 5 |
| Mannitol - Starch* | 239.75 | 479.5 | 237.25 | 200 | 125 | 25 | 5 | 4 | 0.5 |
| Starch | 13 | 13 | 13 | 13 | 13 | 13 | 13 | 13 | 13 |
| Lactose | 13 | 13 | 13 | 37.25 | 112.25 | 212.25 | 232.25 | 233.25 | 236.75 |
| Sodium Lauryl sulphate | 2.4 | 4.8 | 2.4 | 2.4 | 2.4 | 2.4 | 2.4 | 2.4 | 2.4 |
| Flavour | 1.2 | 2.4 | 1.2 | 1.2 | 1.2 | 1.2 | 1.2 | 1.2 | 1.2 |
| Aspartame | 1.2 | 2.4 | 1.2 | 1.2 | 1.2 | 1.2 | 1.2 | 1.2 | 1.2 |
| Magnesium stearate | 2.4 | 4.8 | 2.4 | 2.4 | 2.4 | 2.4 | 2.4 | 2.4 | 2.4 |
| Talc | 0.55 | 1.1 | 0.55 | 0.55 | 0.55 | 0.55 | 0.55 | 0.55 | 0.55 |
| Core weight | 250 | 500 | 250.00 | 250.00 | 250.00 | 250.00 | 250.00 | 250.00 | 250 |
| % w/w DT excipient# | 95.9% | 95.9% | 94.9% | 80% | 50% | 10% | 2% | 1.6% | 0.36% |

*Pearlitol Flash ® is used as Mannitol-starch
DT = Disintegrating excipient

Table 8 provides Disintegrating excipient content experiment evaluation (A32 to A40) of the orodispersible tablets.

TABLE 8

Disintegrating excipient content experiment result

| Characteristic attributes | A32 | A33 | A34 | A35 | A36 | A37 | A38 | A39 | A40 |
|---|---|---|---|---|---|---|---|---|---|
| Disintegration time (S) | 145 | 205 | 19 | 24 | 25 | 28 | 28 | 29 | 197 |

TABLE 8-continued

Disintegrating excipient content experiment result

| Characteristic attributes | A32 | A33 | A34 | A35 | A36 | A37 | A38 | A39 | A40 |
|---|---|---|---|---|---|---|---|---|---|
| Flowability | Good | Good | Good | Good | Good | Good | Good | Good | Good |
| Picking/Sticking | No | No | No | No | No | No | No | No | No |
| Hardness (N) | 89 | 78 | 52 | 49 | 59 | 53 | 57 | 55 | 43 |
| Friability (%) | 0.17% | 0.23% | 0.59% | 0.24% | 0.29% | 0.15% | 0.09% | 0.2% | 0.27% |
| Dissolution at 6.8 pH | | | | | | | | | |
| at 5 min (%) | 52 | 49 | 58 | 59 | 63 | 60 | 59 | 57 | 45 |
| at 30 min (%) | 73 | 70 | 81 | 81 | 91 | 85 | 87 | 83 | 65 |

The orally disintegrating tablets prepared using formula of A34 & A39 having 1.6% to 94.9% w/w of disintegrating excipient showed optimum disintegration time (19-29 seconds), hardness (49-59 N), dissolution of at least about 55% at 5 minutes and more than about 80% at 30 minutes.

However, orally disintegrating tablet of A32 & A33 (having 95.9% w/w disintegrating excipient) and A40 (having 0.36% w/w disintegrating excipient) did not achieved desired dissolution profile.

Example 5: Evaluation of Effect of Drug-Excipient Ratio on Disintegration and Dissolution of Apixaban Formulation with Different Particle Size Using Direct Compression Orally disintegrating tablet were prepared using micronized apixaban (D90<100 microns; A41-A43); unmicronized apixaban (D90>100 microns; A44-A46) and mixture of both; A47 to A49) and disintegrating excipient in specific ratio using direct compression.

As experiments of example 6 showed that apixaban to disintegrating excipient ratio of 1:1 to 1:95 showed optimum result for disintegration time and dissolution of apixaban, the above (1:0.1) and below (1:96) ratio limits were evaluated for the purpose of this example.

The orally disintegrating tablets prepared using apixaban to drug excipient ration of 1:0.1 and 1:96 did not result in optimum disintegration time and dissolution profile at 5 & 30 minutes for tablets containing micronized particles, unmicronized particles and micronized+unmicronized particle mixture of apixaban.

This showed that apixaban to disintegrating excipient ratio between 1:0.2 to 1:95 provides optimum dissolution profile for tablets prepared using direct compression.

Example 6: Evaluation of Effect of Drug-Excipient Ratio on Disintegration and Dissolution of Apixaban Formulation with Different Particle Size Using Dry Granulation and Results Orally disintegrating tablet were prepared using micronized apixaban (D90<100 microns; A50-A52); unmicronized apixaban (D90>100 microns; A53-A55) and mixture of both; A56 to A58) and disintegrating excipient in specific ratio using dry granulation.

As experiments of example 6 showed that apixaban to disintegrating excipient ratio of 1:0.2 to 1:95 showed optimum result for disintegration time and dissolution of apixaban, the above (1:0.1) and below (1:96) ratio limits were evaluated for the purpose of this example.

TABLE 9

Drug-excipient ratio experiment batches by direct compression and results

| | Micronized API D90: 1-100 micron | | | Non-micronized API D90: above 100 micron | | | Micronized + Non-micronized API mixture | | |
|---|---|---|---|---|---|---|---|---|---|
| Component | A41 | A42 | A43 | A44 | A45 | A46 | A47 | A48 | A49 |
| Apixaban | 5 | 5 | 5 | 5 | 5 | 5 | 5 | 5 | 5 |
| Mannitol + Starch (Pearlitol ® Flash) | 0.5 | 109.6 | 480 | 0.5 | 109.6 | 480 | 0.5 | 109.6 | 480 |
| Lactose | 148.9 | 39.8 | 9.4 | 148.9 | 39.8 | 9.4 | 148.9 | 39.8 | 9.4 |
| Sodium Lauryl sulphate | 1.6 | 1.6 | 1.6 | 1.6 | 1.6 | 1.6 | 1.6 | 1.6 | 1.6 |
| Flavour | 1.2 | 1.2 | 1.2 | 1.2 | 1.2 | 1.2 | 1.2 | 1.2 | 1.2 |
| Aspartame | 0.8 | 0.8 | 0.8 | 0.8 | 0.8 | 0.8 | 0.8 | 0.8 | 0.8 |
| Ma stearate | 1.6 | 1.6 | 1.6 | 1.6 | 1.6 | 1.6 | 1.6 | 1.6 | 1.6 |
| Talc | 0.4 | 0.4 | 0.4 | 0.4 | 0.4 | 0.4 | 0.4 | 0.4 | 0.4 |
| Core weight | 160.00 | 160.00 | 500.00 | 160.00 | 160.00 | 500.00 | 160.00 | 160.00 | 500.00 |
| Weight ratio | 1:0.1 | 1:21.92 | 1:96 | 1:0.1 | 1:21.92 | 1:96 | 1:0.1 | 1:21.92 | 1:96 |
| DT time (S) | 75 | 29 | 196 | 105 | 28 | 185 | 101 | 29 | 199 |
| Dissolution at 6.8 pH | | | | | | | | | |
| at 5 min (%) | 50 | 58 | 49 | 52 | 60 | 48 | 45 | 63 | 51 |
| at 30 min (%) | 65 | 83 | 65 | 63 | 83 | 60 | 60 | 91 | 67 |

TABLE 10

Drug-excipient ratio experiment batches by dry granulation

| Component | Micronized API D90: 1-100 micron | | | Non-micronized API D90: above 100 micron | | | Micronized + Non-micronized API mixture | | |
|---|---|---|---|---|---|---|---|---|---|
| | A50 | A51 | A52 | A53 | A54 | A55 | A56 | A57 | A58 |
| Apixaban | 5 | 5 | 5 | 5 | 5 | 5 | 5 | 5 | 5 |
| Mannitol + Starch (Pearlitol ® Flash) | 0.5 | 109.6 | 480 | 0.5 | 109.6 | 480 | 0.5 | 109.6 | 480 |
| Lactose | 148.9 | 39.8 | 9.4 | 148.9 | 39.8 | 9.4 | 148.9 | 39.8 | 9.4 |
| Sodium Lauryl sulphate | 1.6 | 1.6 | 1.6 | 1.6 | 1.6 | 1.6 | 1.6 | 1.6 | 1.6 |
| Flavour | 1.2 | 1.2 | 1.2 | 1.2 | 1.2 | 1.2 | 1.2 | 1.2 | 1.2 |
| Aspartame | 0.8 | 0.8 | 0.8 | 0.8 | 0.8 | 0.8 | 0.8 | 0.8 | 0.8 |
| Mg stearate | 1.6 | 1.6 | 1.6 | 1.6 | 1.6 | 1.6 | 1.6 | 1.6 | 1.6 |
| Talc | 0.4 | 0.4 | 0.4 | 0.4 | 0.4 | 0.4 | 0.4 | 0.4 | 0.4 |
| Core weight | 160.00 | 160.00 | 500.00 | 160.00 | 160.00 | 500.00 | 160.00 | 160.00 | 500.00 |
| Weight ratio | 1:0.1 | 1:21.92 | 1:96 | 1:0.1 | 1:21.92 | 1:96 | 1:0.1 | 1:21.92 | 1:96 |
| DT time (S) | 85 | 27 | 185 | 95 | 26 | 210 | 75 | 29 | 190 |
| Dissolution at 6.8 pH | | | | | | | | | |
| at 5 min (%) | 48 | 63 | 51 | 49 | 60 | 48 | 48 | 65 | 52 |
| at 30 min (%) | 69 | 89 | 71 | 61 | 86 | 65 | 63 | 93 | 60 |

The orally disintegrating tablets prepared using apixaban to drug excipient ration of 1:0.1 and 1:96 did not result in optimum disintegration time and dissolution profile at 5 & 30 minutes for tablets containing micronized particles, unmicronized particles and micronized+unmicronized particle mixture of apixaban.

This showed that apixaban to disintegrating excipient ratio between 1:0.2 to 1:95 provides optimum dissolution profile for tablets prepared using dry granulation without being limited to any particle size of apixaban.

Example 7: Evaluation of Effect of Drug-Excipient Ratio on Disintegration and Dissolution of Apixaban Formulation with Different Particle Size Using Wet Granulation Orally disintegrating tablet were prepared using micronized apixaban (D90<100 microns; A59-A61); unmicronized apixaban (D90>100 microns; A62-A64) and mixture of both; A65 to A67) and disintegrating excipient in specific ratio using wet granulation. As experiments of example 6 showed that apixaban to disintegrating excipient ratio of 1:0.2 to 1:95 showed optimum result for disintegration time and dissolution of apixaban, the above (1:0.1) and below (1:96) ratio limits were evaluated for the purpose of this example.

TABLE 11

Drug-excipient ratio experiment batches by wet granulation

| Component | Micronized API D90: 1-100 micron | | | Non-micronized API D90: above 100 micron | | | Micronized + Non-micronized API mixture | | |
|---|---|---|---|---|---|---|---|---|---|
| | A59 | A60 | A61 | A62 | A63 | A64 | A65 | A66 | A67 |
| Intragranular | | | | | | | | | |
| Apixaban | 5 | 5 | 5 | 5 | 5 | 5 | 5 | 5 | 5 |
| Mannitol + Starch (Pearlitol ® Flash) | 0.25 | 82.2 | 360 | 0.25 | 82.2 | 360 | 0.25 | 82.2 | 360 |
| Lactose | 148.9 | 39.8 | 9.4 | 148.9 | 39.8 | 9.4 | 148.9 | 39.8 | 9.4 |
| Granulating liquid | q.s. | q.s. | q.s. | q.s. | q.s. | q.s. | q.s. | q.s. | q.s. |
| Extragranular | | | | | | | | | |
| Mannitol + Starch | 0.25 | 27.4 | 120 | 0.25 | 27.4 | 120 | 0.25 | 27.4 | 120 |
| Sodium Lauryl sulphate | 1.6 | 1.6 | 1.6 | 1.6 | 1.6 | 1.6 | 1.6 | 1.6 | 1.6 |
| Flavour | 1.2 | 1.2 | 1.2 | 1.2 | 1.2 | 1.2 | 1.2 | 1.2 | 1.2 |
| Aspartame | 0.8 | 0.8 | 0.8 | 0.8 | 0.8 | 0.8 | 0.8 | 0.8 | 0.8 |
| Magnesium stearate | 1.6 | 1.6 | 1.6 | 1.6 | 1.6 | 1.6 | 1.6 | 1.6 | 1.6 |
| Talc | 0.4 | 0.4 | 0.4 | 0.4 | 0.4 | 0.4 | 0.4 | 0.4 | 0.4 |
| Core weight | 160.00 | 160.00 | 500.00 | 160.00 | 160.00 | 500.00 | 160.00 | 160.00 | 500.00 |
| Weight ratio | 1:0.1 | 1:21.92 | 1:96 | 1:0.1 | 1:21.92 | 1:96 | 1:0.1 | 1:21.92 | 1:96 |
| DT time (S) | 95 | 29 | 205 | 88 | 25 | 194 | 101 | 28 | 183 |
| Dissolution at 6.8 pH | | | | | | | | | |
| at 5 min (%) | 51 | 61 | 49 | 52 | 66 | 53 | 45 | 70 | 48 |
| at 30 min (%) | 70 | 92 | 75 | 68 | 93 | 60 | 72 | 92 | 69 |

The orally disintegrating tablets prepared using apixaban to drug excipient ratio of 1:0.1 and 1:96 did not result in optimum disintegration time and dissolution profile at 5 & 30 minutes for tablets containing micronized particles, unmicronized particles and micronized +unmicronized particle mixture of apixaban.

This showed that apixaban to disintegrating excipient ratio between 1:0.2 to 1:95 provides optimum dissolution profile for tablets prepared using wet granulation without being limited to any particle size of apixaban.

In summary, disintegration time and dissolution profile of orally disintegrating tablet of apixaban were improved using 0.5% to 50% w/w of apixaban, 0.5% to 95% w/w of disintegrating excipient and also using 1:0.2 to 1:95 apixaban to disintegrating excipient ratio. These parameters provided orally disintegrating tablet with optimum disintegration time and dissolution profile with all range of particle size of apixaban and with all types of manufacturing process.

Based on these results, following formulation was selected for further evaluation:

TABLE 12

2.5 mg/5 mg Apixaban orodispersible tablet composition

| Components | Mg/Tablet | | |
|---|---|---|---|
| | P1 | P2 | P3 |
| Apixaban | 2.5 | 5 | 10 |
| Mannitol | 27.44 | 54.88 | 109.76 |
| Starch | 6.86 | 13.72 | 27.44 |
| Lactose | 20.4 | 40.8 | 81.6 |
| Microcrystalline Cellulose | 12 | 24.00 | 48 |
| Crospovidone | 8 | 16.00 | 32 |
| Sodium Lauryl sulphate | 0.8 | 1.6 | 3.2 |
| Flavour | 0.6 | 1.2 | 2.4 |
| Aspartame | 0.4 | 0.8 | 1.6 |
| Magnesium stearate | 0.8 | 1.6 | 3.2 |
| Talc | 0.2 | 0.4 | 0.8 |
| Core weight | 80.00 | 160.00 | 320.00 |

Example 8: Apixaban Orally Disintegrated Tablets Preparation by Direct Compression The orally disintegrating tablet of apixaban was prepared by direct compression method.

TABLE 13

Apixaban orally disintegrated tablets prepared by direct compression

| Component | mg/tab | mg/tab | % w/w (%) |
|---|---|---|---|
| Apixaban | 2.5 | 5 | 3.12 |
| Mannitol | 34.30 | 68.60 | 42.88 |
| Lactose | 20.40 | 40.80 | 25.75 |
| Microcrystalline Cellulose | 12.00 | 24.00 | 15.00 |
| Crospovidone | 8.00 | 16.00 | 10.00 |
| Sodium Lauryl sulphate | 0.8 | 1.6 | 1.0 |
| Flavour | 0.6 | 1.2 | 0.5 |
| Aspartame | 0.4 | 0.8 | 0.5 |
| Magnesium stearate | 0.8 | 1.6 | 1.0 |
| Talc | 0.2 | 0.4 | 0.25 |
| Core weight | 80.00 | 160.00 | 100 |

Manufacturing Process

1. Co-sift Apixaban, microcrystalline cellulose, sodium lauryl sulphate, Crospovidone through #40 sieve
2. Co-sift lactose monohydrate, mannitol and step-1 sifted material through #40 sieve
3. Co-sift mannitol, aspartame powder and flavour through #40 sieve
4. Co-sift magnesium stearate and talc through #60 sieve
5. Load the material of step-3 into the blender and mix it for 10 minutes at 12 RPM
6. Load the material of step-4 into the blender containing blend of step-6 and mix it for 20 minutes at 12 RPM
7. Load the material of step-5 into the blender containing pre-lubricated blend of step-7 and mix it for 5 minutes at 12 RPM
8. Lubricated blend of step-8 was compressed into tablets.

Example 9

TABLE 14

Apixaban orally disintegrated tablets preparation by dry granulation

| Ingredients | mg/tab | mg/tab | % w/w (%) |
|---|---|---|---|
| Apixaban | 2.5 | 5 | 3.12 |
| Mannitol-Starch (Pearlitol Flash ®) | 34.30 | 68.60 | 42.88 |
| Lactose | 20.4 | 40.8 | 25.75 |
| Microcrystalline Cellulose | 12.0 | 24.0 | 15.00 |
| Crospovidone | 8.0 | 16.0 | 10.00 |
| Sodium lauryl sulfate | 0.8 | 1.6 | 1.0 |
| Magnesium stearate | 0.8 | 1.6 | 0.5 |
| Aspartame | 0.4 | 0.8 | 0.5 |
| Flavour | 0.6 | 1.2 | 1.0 |
| Talc | 0.2 | 0.4 | 0.25 |
| Core weight | 80 | 160 | 100 |

Procedure

1. Blend the raw materials, with apixaban of controlled particle size;
2. Include Intragranular portions of Disintegrant and other fillers in the mix from step (1) and granulate the materials using process mentioned below.
3. Delump the Intragranular lubricant using a suitable screen or mill. Add the lubricant to the blend from step (2). Compact the lubricated blend to ribbons of suitable density and size the compacted ribbons using a roller compactor.
4. Blend the sized granules from step (3) and extragranular disintegrant including other required excipients in a suitable blender.
5. Delump the extragranular lubricant using a suitable screen/mill and blend with granules from step (4).
6. Compress the blend from step (5) into tablets.

Example 10

TABLE 15

Apixaban orally disintegrated tablets preparation by wet granulation

| Ingredients | mg/tab | mg/tab | % w/w (%) |
|---|---|---|---|
| | Intragranular | | |
| Apixaban | 2.5 | 5 | 3.12 |
| Mannitol-Starch | 41.1 | 82.2 | 51.75 |

TABLE 15-continued

Apixaban orally disintegrated tablets preparation by wet granulation

| Ingredients | mg/tab | mg/tab | % w/w (%) |
|---|---|---|---|
| Lactose Anhydrous | 19.9 | 39.8 | 24.88 |
| Granulating fluid | q.s. | q.s. | — |
| | Extragranular | | |
| Mannitol-Starch | 13.7 | 27.4 | 17.12 |
| Sodium lauryl sulfate | 0.8 | 1.6 | 1.0 |
| Flavour | 0.6 | 1.2 | 0.75 |
| Aspartame | 0.4 | 0.8 | 0.5 |
| Magnesium stearate | 0.8 | 1.6 | 1.0 |
| Talc | 0.2 | 0.4 | 0.25 |
| Core weight | 80.0 | 160.00 | 100 |

Procedure

1. Co-Sift apixaban, lactose, mannitol, crospovidone and sodium lauryl sulphate through #40 sieve.
2. Co- Sift flavour and sweetener with mannitol through #40 sieve.
3. Sift talc and magnesium stearate through #60 mesh and collect in separate polybag.
4. Granulate the material of step 3 using appropriate binder. Knead the wet mass to achieve desired granulation and if required add extra amount of binder.
5. Dry wet granules of step 4 at inlet temperature of 60° C.±10° C. in fluidized bed dryer. Loss on drying of granules should be between 1.00% to 3.00% w/w at 105° C. by halogen moisture analyzer.
6. Sift the dried granules. Mill the retained granules if required.
7. Load the dried granules blender and mix properly.
8. Add sifted mannitol, sweetener and flavour to above mixture and mix it properly.
9. Add sifted magnesium stearate and talc and lubricate it.
10. Compress the lubricated granules.

Example 11: Dissolution Study

Dissolution profiles of 5 mg Formulation Example P2 and a commercial immediate release film coated tablet of ELIQUIS® were measured.

Example P2 was prepared using direct compression process.

The dissolution test is performed on the tablets to be tested using Apparatus 2 as described in Chapter 711 (Dissolution) of the US Pharmacopeia under the following conditions:

Stirring speed: 50 rpm, Temperature: 37° C.-0.5° C.,
Solvent:
  a. pH 1.0-1.2: Hydrochloric Acid (HCl), water
  b. pH 4.5: sodium acetate triydrate (C2H9NaO5), acetic acid(CH3COOH), and water
  c. pH 6.8: Potassium dihydrogen phosphate(KH2PO4), Sodium Hydroxide(NaOH) and water,
Volume of solvent: 900 ml, Total time: 60 minutes
Sampling interval: 5, 10, 15, 20, 30, 45 and 60 minutes

TABLE 16

Dissolution profile results of formulation P2 compared to ELIQUIS®:

| | Drug release (%) | | | | | |
|---|---|---|---|---|---|---|
| t | pH 1.2 | | pH 4.5 | | pH 6.8 | |
| (min) | P2 | ELIQUIS® | P2 | ELIQUIS® | P2 | ELIQUIS® |
| 5 | 58 | 27 | 72 | 25 | 63 | 26 |
| 10 | 73 | 56 | 78 | 51 | 73 | 49 |
| 15 | 80 | 68 | 83 | 63 | 78 | 61 |
| 20 | 83 | 71 | 85 | 68 | 81 | 66 |
| 30 | 86 | 78 | 88 | 75 | 83 | 73 |
| 45 | 88 | 82 | 90 | 80 | 85 | 79 |
| 60 | 89 | 86 | 96 | 84 | 85 | 82 |

The dissolution profiles show that the dosage forms of the invention had a very superior release profile for apixaban at 1.2, 4.5 & 6.8 pH compared to ELIQUIS® under the same conditions. FIGS. 1, 2 & 3 shows comparative dissolution profile of orally disintegrating tablet of present invention and ELIQUIS®.

Example 12: Bioavailability Study

A bioequivalence study was carried out to compare and evaluate the single-dose oral bioavailability of orally disintegrating tablet of composition P2 as disclosed in table 12 when given without water (T1) and with water (T2) against film-coated tablet containing apixaban 5 mg in healthy, adult, human subjects under fasting conditions as well as to monitor the safety and tolerability of subjects.

Study Design

An Open Label, Balanced, Randomized, Single-Dose, Three-treatment, Six-Sequence, Three-period, crossover oral Bioequivalence Study in Healthy, Adult, Human Subjects under Fasting Condition.

In the present study, the two formulations of test (T1 and T2) and the Reference (R) i.e. ELIQUIS® IR tablets were administered as a single 5 mg oral dose to 18 healthy subjects under fasting conditions according to the following randomized, six-sequence, three-period, three way crossover design:

TABLE 17

Bioavailability study design

| | Period 1 | Period 2 | Period 3 |
|---|---|---|---|
| Sequence 1 (n = 3) | Test (T1) | Test (T2) | Reference (R) |
| Sequence 2 (n = 3) | Test (T2) | Reference (R) | Test (T1) |
| Sequence 3 (n = 3) | Reference (R) | Test (T1) | Test (T2) |
| Sequence 4 (n = 3) | Test (T1) | Reference (R) | Test (T2) |
| Sequence 5 (n = 3) | Test (T2) | Test (T1) | Reference (R) |
| Sequence 6 (n = 3) | Reference (R) | Test (T2) | Test (T1) |

(Where T1 = Test Product without Water; T2 = Test Product with Water; R = Reference Product).

Rational

This study was conducted to characterize the pharmacokinetic profile of the composition P2 when given without water (T1) and with water (T2) in comparison to the reference product after a single oral dose administration to healthy, adult, human subjects under fasting conditions. Single doses of ODT composition of P2 when given without water (T1) and with water (T2) and film coated reference (R) product were administered at a dose of 5 mg.

The dose was chosen to achieve sufficient analyte plasma levels to characterize the pharmacokinetic profile accurately; this dose and fasting study was expected to be well tolerated.

Number of Subjects

A total of 18 healthy, adult, human subjects were enrolled in the study.

Randomization Method

Randomization was done using SAS® (SAS Institute Inc., USA) Version 9.4 or higher. Randomization was done in blocks using PROC PLAN such that the design remained balanced. During the study, subjects were administered either the test product of the present invention without water (T1) and with water (T2) or the reference product (R) in respective periods according to the randomization schedule.

Duration of Treatment

Total duration of the study was at least 18 days from day of admission of first period till end of the second period. The actual overall study duration may vary.

Subjects underwent a screening procedure not more than 21 days before first day of dosing. On entering the study, subjects were housed for at least 11:00 hours prior to dosing to ensure 10.00 hours of overnight fasting before dosing and continued to be housed in the clinical facility till 24.00 hours post-dose in each study period.

A washout period of at least 07 days were kept between each dosing periods which is sufficient enough to ensure complete elimination of the drug.

Blood sample will be collected in-house up to 24.00 hours post-dose in each period and subjects will return to the clinical facility for the 48.00 hour ambulatory blood sample in each study period.

Investigational Products

| Test Product | Apixaban Tablets 5 mg<br>Label Claim:<br>Each Orodispersible Tablet contains:<br>Apixaban . . . 5 mg<br>Manufactured by: Unison Pharmaceuticals Pvt. Ltd., India |
|---|---|
| Reference Product (R): | ELIQUIS ® 5 mg film-coated tablets.<br>Label Claim:<br>Each tablet contains 5 mg apixaban.<br>Marketing Authorization Holder:<br>Bristol-Myers Squibb/Pfizer EEIG. |

Inclusion Criteria

Subjects were selected for study participation, if they meet the following criteria:
1. Healthy, non-smokers, literate subjects aged between 18 and 45 years (both inclusive) that were able to understand and comply with the study procedures and having given their written informed consent were checked in for the study. They did not have any clinical abnormal findings as determined by personal medical history, clinical examination and laboratory examinations such as 12-lead electrocardiogram (ECG), X-Ray (PA view), within the clinically acceptable normal range.
2. Subjects weighing within normal values for Body Mass Index [18.50 to 30.00 kg/m2 (both inclusive)] with ≥60 kg weight.
3. Subject with Hemoglobin level ≥11.5 G % at the time of screening.
4. Subjects having negative urine screen for drugs of abuse (including amphetamines, barbiturates, benzodiazepines, tetrahydrocannabinol (THC), cocaine, and morphine).

Test Method

The subjects were fasted overnight for at least 10.00 hours before schedule dosing time.

Dosing Procedure for Test Product without Water (T1)

The Subjects were fasted overnight for at least 10 hours prior to scheduled time for dosing, just prior to drug administration, each subject was instructed to wet his/her mouth with approximately 20±2 mL of water at ambient temperature in sitting posture, followed by swallowing of this water. Subsequently, one tablet of the test Investigational product (allocated as per the randomization schedule) was placed on the subject's tongue at scheduled dosing time and was allowed to disintegrate for 30 seconds.

Dosing Procedure for Test Product with Water (T2)

The Subjects were fasted overnight for at least 10 hours prior to scheduled time for dosing, just prior to drug administration, each subject was instructed to wet his/her mouth with approximately 20±2 mL of water at ambient temperature in sitting posture, followed by swallowing of this water. Subsequently, one tablet of the test Investigational product (allocated as per the randomization schedule) will be placed on the subject's tongue at scheduled dosing time and will be allowed to disintegrate for 30 seconds. Thereafter, remaining 220±2 mL of water will be administered. Note: Total 240±2 mL of water will be used to complete the dosing procedure.

Dosing Procedure for Reference Product (R)

The Subjects will be fasted overnight for at least 10 hours prior to scheduled time for dosing, one tablet will be administered orally to the subjects at scheduled dosing time in a sitting posture with about 240±2 mL of water at ambient temperature as per the randomization schedule in each period under the supervision of trained study personnel.

Sampling Schedule

The sampling schedule was planned to provide an adequate estimation of $C_{max}$ and to cover the plasma concentration-time curve long enough to provide a reliable estimate of the extent of absorption. A total of 25 blood samples were collected during each study period.

Samples were collected through an indwelling cannula placed in a forearm vein. The Pre-dose blood sample were collected within one hour prior to dosing and the post-dose in house blood samples were collected within 2 minutes from the scheduled sampling time.

Pre-dose (00.00 hour) blood sample of 4.0 mL was collected within one hour prior to dosing of each period. Post dose samples of 4.0 mL were drawn at 0.17, 0.33, 0.50, 0.67, 0.83, 1.00, 1.33, 1.67, 2.00, 2.33, 2.67, 3.00, 3.33, 3.67, 4.00, 4.33, 4.67, 5.00, 6.00, 8.00, 12.00, 18.00, 24.00 and 48.00 hours following drug administration in each study period. All collected samples were centrifuged at 4000 rpm for 10 minutes at 4° C. (short term excursion permitted up to 8° C.). Blood sample that were collected will be placed on wet ice bath from the point of collection until storage of plasma samples.

For all the blood samples, the plasma obtained after centrifugation were aliquoted into two pre-labelled Cryo vials. In first Cryo vial (Aliquot 1), approximately 0.8 mL of plasma was transferred and remaining plasma was transferred in second Cryo vial (Aliquot 2). Cryo vials were stored below −15° C. at clinical site till the completion of each period and then transferred to the Bioanalytical facility and stored at −78±8° C. until analysis.

Pharmacokinetic Parameters

Pharmacokinetic parameters such as $C_{max}$ (Maximum observed plasma concentration), $AUC_{0-t}$ (Area under the plasma concentration-time curve from time zero to time of last quantifiable analyte concentration), $T_{max}$ (Time to reach maximum observed concentration), $AUC_{0-\infty}$, AUC_%Extrap_obs, $t_{1/2}$, $AUC_{0-t}/AUC_{0-\infty}$ and $\lambda z$ were calculated using plasma concentration vs. time profile (Actual time of sample collection) data of the investigational products in individual subjects using Non-Compartment Model of Phoenix WinNonlin® Software Version 8.0 or higher.

Out of 18 subjects, 2 did not complete the study.

The relative bioavailability analyses of Test Product vs. Reference Product-R for Apixaban are summarized in the following table:

TABLE 18

Relative Bioavailability Results for Apixaban (N = 16)

| Pair (Test/Reference) | Parameters | Geometric mean | | T/R Ratio | 90% Confidence interval | Intra subject CV (%) |
|---|---|---|---|---|---|---|
| | | Test Product | Reference Product | | | |
| ODT without water/IR (T1) (N=16) | $C_{max}$ (ng/mL) | 174.976 | 184.772 | 94.53 | 87.45-102.19 | 12.45 |
| | $AUC_{0-t}$ (hr*ng/mL) | 1671.227 | 1719.578 | 97.1 | 91.30-103.26 | 9.82 |
| | $AUC_{0-\infty}$ (hr*ng/mL) | 1748.709 | 1799.747 | 97.02 | 91.94-102.38 | 8.57 |
| | $T_{max}$ (hr) | 3.165 | 4.33 | — | — | — |
| ODT with water/IR (T2) (N=16) | $C_{max}$ (ng/mL) | 178.257 | 184.772 | 96.33 | 91.12-101.83 | 8.85 |
| | $AUC_{0-t}$ (hr*ng/mL) | 1735.937 | 1719.578 | 100.58 | 95.48-105.94 | 8.28 |
| | $AUC_{0-\infty}$ (hr*ng/mL) | 1822.285 | 1799.747 | 100.99 | 96.40-105.81 | 7.42 |
| | $T_{max}$ (hr) | 4.33 | 4.33 | — | — | — |

Results of Table 18 show that orally disintegrating tablet of the present invention (Test Product-in studies T1 (without water) & T2 (with water)) when compared with ELIQUIS® 5 mg (Reference Product-R) under fasting condition meets the bioavailability criteria with respect to Cmax, $AUC_{0-t}$, $AUC_{0-\infty}$ & $T_{max}$ for apixaban as per criteria set in the protocol. The, orally disintegrating tablet of the present invention is bioequivalent to the reference product (ELIQUIS®).

We claim:

1. An orally disintegrating pharmaceutical dosage form comprising a therapeutically effective amount of apixaban or a pharmaceutically acceptable salt thereof and at least one disintegrating excipient wherein the dosage form has hardness of about 10N to about 200N and a disintegration time of less than about 3 minutes, wherein the weight ratio of apixaban to said disintegrating excipient is from about 1:5 to about 1:95,
   wherein the disintegrating excipient comprises mannitol and corn starch, wherein for purposes of determining the weight ratio of apixaban to the disintegrating excipient, the disintegrating excipient comprises the mannitol and the corn starch.

2. The orally disintegrating pharmaceutical dosage form according to claim 1, wherein the dosage form has said disintegration time of less than about 60 seconds.

3. The orally disintegrating pharmaceutical dosage form according to claim 1, further comprising one or more additional excipients selected from the group consisting of diluent, binder, surfactant, lubricant, and glidant.

4. The orally disintegrating pharmaceutical dosage form according to claim 3, wherein the additional excipient is selected from the group consisting of lactose, xylitol, fructose, sorbitol, anhydrous dibasic calcium phosphate, magnesium aluminosilicate, and colloidal silicon dioxide.

5. The orally disintegrating pharmaceutical dosage form according to claim 1, wherein said dosage form is selected from the group consisting of tablet, mini-tablet, granules, pellets, and capsules.

6. An orally disintegrating pharmaceutical dosage form according to claim 1 wherein said therapeutically effective amount of apixaban or a pharmaceutically acceptable salt thereof is in an amount from about 0.5% w/w to about 50% w/w of a total composition, and said at least one disintegrating excipient is in an amount from about 0.5% w/w to about 95% w/w of said total composition, and optionally comprising one or more pharmaceutically acceptable excipients thereof.

7. The orally disintegrating pharmaceutical dosage form according to claim 6, wherein said at least one disintegrating excipient is present in an amount from about 5% w/w to 90% w/w.

8. The orally disintegrating pharmaceutical dosage form according to claim 6 wherein upon oral administration to a patient the dosage form provides a plasma concentration Cmax of apixaban between about 90 ng/ml to about 275 ng/ml and total drug exposure (AUC$_{0-t}$) of apixaban between about 800 ng·hr/ml to about 2400 ng·hr/ml.

9. The orally disintegrating pharmaceutical dosage form according to claim 1 wherein upon oral administration the dosage form provides a plasma concentration Cmax of apixaban between about 90 ng/ml to about 275 ng/ml and total drug exposure (AUC$_{0-t}$) of apixaban between about 800 ng·hr/ml to about 2400 ng·hr/ml.

10. An orally disintegrating pharmaceutical dosage form comprising a therapeutically effective amount of apixaban or a pharmaceutically acceptable salt thereof and at least one disintegrating excipient, wherein the weight ratio of apixaban to said disintegrating excipient is from about 1:5 to about 1:95,
wherein the disintegrating excipient comprises mannitol and corn starch, wherein for purposes of determining the weight ratio of apixaban to the disintegrating excipient, the disintegrating excipient comprises the mannitol and the corn starch.

11. The orally disintegrating pharmaceutical dosage form according to claim 8 wherein the dosage form has a hardness of about 40N to about 90N.

12. The orally disintegrating pharmaceutical dosage form according to claim 10, wherein the dosage form has a disintegration time of less than about 3 minutes.

13. The orally disintegrating pharmaceutical dosage form according to claim 8, wherein the weight ratio of apixaban to said disintegrating excipient is from about 1:5 to about 1:60.

14. The orally disintegrating pharmaceutical dosage form according to claim 2, wherein said dosage form is selected from the group consisting of tablet, mini-tablet, granules, pellets, and capsules.

15. The orally disintegrating pharmaceutical dosage form according to claim 10 wherein upon oral administration to a patient the dosage form provides a plasma concentration Cmax of apixaban between about 90 ng/ml to about 275 ng/ml and total drug exposure (AUC$_{0-t}$) of apixaban between about 800 ng·hr/ml to about 2400 ng·hr/ml.

16. A method of treating a thromboembolic disorder in a patient comprising administering to said patient a therapeutically effective amount of an orally disintegrating pharmaceutical dosage form comprising a therapeutically effective amount of apixaban or a pharmaceutically acceptable salt thereof and at least one disintegrating excipient, wherein the weight ratio of apixaban to said disintegrating excipient is from about 1:5 to about 1:95,
wherein the disintegrating excipient comprises mannitol and corn starch, wherein for purposes of determining the weight ratio of apixaban to the disintegrating excipient, the disintegrating excipient comprises the mannitol and the corn starch
wherein the thromboembolic disorder is selected from the group consisting of arterial and venous cardiovascular thromboembolic disorders, and thromboembolic disorders of the heart.

17. The method of treating a thromboembolic disorder in a patient according to claim 16 wherein the thromboembolic disorder is selected from the group consisting of deep vein thrombosis, venous thrombosis, arterial embolism, pulmonary embolism, peripheral artery disease, venous thromboembolic events in adults who have undergone elective hip or knee surgery, and non-valvular arterial fibrillation.

18. The method of treating a thromboembolic disorder in a patient according to claim 16 wherein the dosage form has a hardness of about 10N to about 200N and a disintegration time of less than about 3 minutes.

19. The method of treating a thromboembolic disorder in a patient according to claim 18 wherein said therapeutically effective amount of apixaban or a pharmaceutically acceptable salt or a prodrug thereof is in an amount from about 0.5% w/w to about 50% w/w of total composition, and wherein said at least one disintegrating excipient is in an amount from about 0.5% w/w to about 95% w/w of total composition, and optionally including one or more pharmaceutically acceptable excipients thereof.

\* \* \* \* \*